US012365762B2

(12) United States Patent
Kou et al.

(10) Patent No.: US 12,365,762 B2
(45) Date of Patent: Jul. 22, 2025

(54) DISPERSANT FOR COATING SYSTEM

(71) Applicant: BASF SE, Ludwigshafen am Rhein (DE)

(72) Inventors: Huiguang Kou, Ludwigshafen am Rhein (DE); Steffen Onclin, Ludwigshafen am Rhein (DE); Frank Pirrung, Ludwigshafen am Rhein (DE); Clemens Auschra, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 1071 days.

(21) Appl. No.: 17/268,673

(22) PCT Filed: Aug. 14, 2019

(86) PCT No.: PCT/EP2019/071793
§ 371 (c)(1),
(2) Date: Feb. 16, 2021

(87) PCT Pub. No.: WO2020/035523
PCT Pub. Date: Feb. 20, 2020

(65) Prior Publication Data
US 2021/0230362 A1 Jul. 29, 2021

(30) Foreign Application Priority Data

Aug. 16, 2018 (EP) ..................................... 18189218

(51) Int. Cl.
| | |
|---|---|
| *C08G 65/333* | (2006.01) |
| *C08G 73/02* | (2006.01) |
| *C09D 7/45* | (2018.01) |
| *C09D 17/00* | (2006.01) |
| *C09D 179/02* | (2006.01) |

(52) U.S. Cl.
CPC ..... *C08G 65/33396* (2013.01); *C08G 73/024* (2013.01); *C09D 7/45* (2018.01); *C09D 17/001* (2013.01); *C09D 179/02* (2013.01); *C08G 2650/50* (2013.01)

(58) Field of Classification Search
CPC ............ C08G 65/33396; C08G 73/024; C08G 2650/50; C08G 65/329; C09D 7/45; C09D 17/001; C09D 179/02; C08L 79/02
See application file for complete search history.

(56) References Cited

U.S. PATENT DOCUMENTS

| | | | | |
|---|---|---|---|---|
| 3,836,471 | A | * 9/1974 | Miller et al. | ........... C08G 81/00 |
| | | | | 508/238 |
| 3,975,428 | A | * 8/1976 | Blahak | ............... C08G 18/3225 |
| | | | | 528/68 |
| 4,180,644 | A | 12/1979 | Marquis et al. | |
| 4,191,706 | A | 3/1980 | Marquis et al. | |
| 4,191,835 | A | 3/1980 | Habermeier et al. | |
| 4,247,677 | A | 1/1981 | Schmidt et al. | |
| 4,260,729 | A | 4/1981 | Schmidt et al. | |
| 4,609,683 | A | * 9/1986 | Grigsby, Jr. | ........ C08G 18/5039 |
| | | | | 521/159 |
| 5,130,463 | A | 7/1992 | Haubennestel et al. | |
| 5,231,149 | A | 7/1993 | Longley et al. | |
| 2003/0212291 | A1 | 11/2003 | Gajewski et al. | |
| 2010/0216361 | A1* | 8/2010 | Bruchmann | ....... C08G 18/4081 |
| | | | | 428/407 |
| 2014/0014004 | A1 | 1/2014 | Mueller-Cristadoro et al. | |

FOREIGN PATENT DOCUMENTS

| | | |
|---|---|---|
| EP | 0021569 A1 | 1/1981 |
| WO | 92/13911 A1 | 8/1992 |
| WO | 00/40630 A1 | 7/2000 |
| WO | 2003/046029 A1 | 6/2003 |
| WO | 2008/107326 A1 | 9/2008 |
| WO | 2013/124830 A1 | 8/2013 |
| WO | 2017/125290 A1 | 7/2017 |
| WO | 2018/162403 A1 | 9/2018 |

OTHER PUBLICATIONS

Jeffamine D230 data sheet. Huntsman. (Year: 2007).*
International Preliminary Report on Patentability received for PCT Patent Application No. PCT/EP2019/071793, mailed on Feb. 25, 2021, 8 pages.
International Search Report and Written Opinion received for PCT Patent Application No. PCT/EP2019/071793, mailed on Oct. 24, 2019, 9 pages.
Elvers et al., "Ullmann's Encyclopedia of Industrial Chemistry—Nucleic Acids to Parasympatholytics", Arpe, 5th Edition, vol. A18, Dec. 1, 1991, pp. 368-426.
European Search Report for EP Patent Application No. 18189218.3, Issued on Mar. 6, 2019, 3 pages.

* cited by examiner

*Primary Examiner* — K. Boyle
(74) *Attorney, Agent, or Firm* — Faegre Drinker Biddle & Reath LLP

(57) ABSTRACT

The present invention relates to a branched modified polyetheramine polyol having a weight average molecular weight $M_w$ in the range of $\geq 1000$ g/mol to $\leq 100000$ g/mol as measured by GPC, that is used as a universal dispersant for coating system, inks and color filters.

16 Claims, No Drawings

DISPERSANT FOR COATING SYSTEM

CROSS-REFERENCE TO RELATED APPLICATIONS

This application is a national stage application (under 35 U.S.C. § 371) of PCT/EP2019/071793, filed Aug. 14, 2019, which claims benefit of European Application No. 18189218.3, filed Aug. 16, 2018, both of which are incorporated herein by reference in their entirety.

FIELD OF THE INVENTION

The present invention relates to a branched modified polyetheramine polyol having a weight average molecular weight $M_w$ in the range of ≥1000 g/mol to ≤100000 g/mol that is used as a universal dispersant for coating system, inks and color filters.

BACKGROUND OF THE INVENTION

Dispersions containing solid dispersible particles, such as organic or inorganic pigments and fillers, and polymer additives, namely dispersants, are used in an almost unlimited number of different technical applications, e.g. as coating materials, for printing inks, colouring plastic materials, including fibres, glasses, or ceramic products, for formulations in cosmetics, or for the preparation of paint systems, in particular automotive, industrial and decorative paints.

The function of the polymeric dispersant in such dispersions is manifold. Mainly, they act as stabilizers for the solid particulate materials, i.e. the dispersant separates the particles of the solid particulate material and thus prevents them from coagulation or clumping and settling from the liquid phase. They also may act as solubilizers in the given carrier liquid, e.g. water or organic solvents. The polymer additives may also improve the gloss of the dispersion or enhance its rheology. Depending on the type and the polarity of the dispersing agent, e.g. water, organic solvents or mixtures thereof, polymers of variable structure are chosen. In view of ecological requirements, the use of the aqueous pigment dispersions is particularly preferred, as well as the dispersions based on organic solvents with high solids content.

WO 92/13911A1 relates to an acetoacetanilide functionalized poly(alkylene glycol), which are prepared by reacting a poly(alkylene glycol) monoamine, diamine or triamine with isatoic anhydride followed by acetoacetylation of the resultant aminobenzamide. WO 92/13911A1 suggests using said acetoacetanilide functionalized poly(alkylene glycol)s for preparing the improved diarylide pigment compositions, which in turn are useful for preparing the storage stable printing inks, especially of the publication gravure type inks.

WO 00/40630 discloses pigment dispersions containing block copolymers as dispersants prepared by the ATRP method (atom transfer radical polymerisation) of ethylenically unsaturated monomers. The block copolymers consist of defined hydrophobic and hydrophilic polymer blocks. WO 03/046029 discloses block copolymers as dispersants, which are similar to those of WO 00/40630 but which are subsequently neutralized with specific salt forming compounds.

WO2008107326 and the literature cited therein relates to poly(alkylene imine) grafted polymers of the acrylate, polyether or polyester type, which are useful as pigment dispersants.

Polymers having pending anthranilate or anthranilamide groups, which may be attached directly or via a bivalent spacer to the polymer back-bone or to the termini of the polymers have been described several times as crosslinkers or chain extenders for polyurethanes or epoxies, e.g. from the following patent documents:

Anthranilate functionalized poly(alkylene oxide)s are e.g. known from U.S. Pat. Nos. 4,180,644, 4,191,706, 4,191,835, 4,247,677, 4,260,729 and US 2003/212291. Anthranilate functionalized poly(alkylene oxide)s are used as a crosslinker agent for polyurethane or epoxy coatings.

Anthranilate functionalized polyesters are e.g. known from EP 21569. They are used as a chain extender in the production of polyurea and polyurea-polyurethane.

Anthranilate functionalized polycarbonates are e.g. known from U.S. Pat. No. 5,231,149.

They are used for the production of graft or block copolymers having improved impact and solvent resistance.

WO 2018/162403 discloses the use of hydrophobically modified polyalkanolamines obtainable by condensing at least one trialkanolamine and optionally further condensable monomers and reacting at least one of the terminal OH groups with suitable reactants capable of reacting with OH groups and comprising long chain hydrocarbon groups as wax inhibitors, pour point depressant and additive for lubricants.

WO 2017/125290 discloses a dispersant composition comprising: a) at least one oligomeric acid A, which has i) at least one acidic group selected from COOH and $PO_3H_2$, and ii) at least one polyoxyalkylene-ether radical of the formula (I): R—(O-A)$_x$O-G-, where A is an $C_2$-$C_4$-alkan-1,2-diyl radical; X is an integer having a number average value in the range from 2 to 20; and R is hydrocarbon radical having from 1 to 30 carbon atoms; G is a chemical bond or a carbonyl group; and b) at least one polyamine B, which is selected from the group consisting of polyvinylamines, poly-$C_2$-$C_3$-alkyleneimines, modified poly-$C_2$-$C_3$-alkyleneimines, melamine compounds, modified melamine compounds, poly-($C_2$-$C_4$-alkyleneether) amines, polyetheramine polyols, and modified polyetheramine polyols.

US 2014/014004 discloses branched polyetheramine polyols with a Hazen colour number in the range of from 100 to 600 (APHA), based on a polycondensation product of at least one trialkanolamine.

In view of the almost unlimited range of different technical applications, there remains a growing need for the dispersants of improved pigment affinity and rheology behaviour, as expressed by the viscosity of the millbase at a given shear rate and improved gloss of surface coatings.

It has now surprisingly found that the use of branched polyetheramine polyol modified with at least one component B having a weight average molecular weight $M_w$ in the range of ≥1000 g/mol to ≤100000 g/mol has beneficial properties while using as a dispersant in coating compositions, such as superior pigment affinity, show improved rheology behaviour and improved gloss of surface coatings.

Therefore, present invention discloses a branched polyetheramine polyol modified with at least one component B having many beneficial properties. The present invention further discloses a branched polyetheramine polyol modified with at least one component B mixed with at least one polymeric carboxylic acid or at least one polymeric phosphoric acid to exhibit many beneficial properties.

SUMMARY OF THE INVENTION

Surprisingly, it was found that the use of a branched polyetheramine polyol modified with at least one component B having a weight average molecular weight $M_w$ in the range of $\geq 1000$ g/mol to $\leq 100000$ g/mol has beneficial properties while using as a dispersant in coating compositions, such as superior pigment affinity, show improved rheology behaviour and improved gloss of surface coatings.

Thus, in first aspect, the presently claimed invention is directed to a branched modified polyetheramine polyol having a weight average molecular weight $M_w$ in the range of $\geq 1000$ g/mol to $\leq 100000$ g/mol, preferably determined by gel permeation chromatography in accordance with DIN 55672-1, which is obtained by reacting a mixture comprising,
  a) at least one branched polyetheramine polyol P containing at least one hydroxyl group, having a weight average molecular weight $M_w$ in the range of $\geq 500$ g/mol to $\leq 10000$ g/mol, preferably determined by gel permeation chromatography in accordance with DIN 55672-1, and
  b) at least one compound B selected from—
  i) compounds of formula (I)

R-Fg  (I)

wherein R is selected from the group consisting of
    linear or branched alkyl having at least 6 carbon atoms, wherein alkyl is unsubstituted or substituted by 1 or 2 radicals selected from OH and $C_1$-$C_4$-alkoxy;
    linear or branched alkenyl having at least 6 carbon atoms, wherein alkenyl is unsubstituted or substituted by 1 or 2 radicals selected from OH and $C_1$-$C_4$-alkoxy;
    a cycloaliphatic radical having at least 5 carbon atoms, wherein the cycloaliphatic radical is unsubstituted or substituted by 1 or 2 radicals selected, from OH, $C_1$-$C_4$-alkyl and $C_1$-$C_4$-alkoxy; and
    aryl and aryl-$C_1$-$C_4$-alkyl, wherein the aryl part is unsubstituted or substituted by 1, 2, 3, 4 or 5 radicals selected from halogen, OH, $NH_2$, $NHC_1$-$C_4$-alkyl, $N(C_1$-$C_4$-alkyl$)_2$, $C_1$-$C_4$-alkyl and $C_1$-$C_4$-alkoxy; and
  Fg is selected from the group consisting of carboxylic acid, carboxylic acid anhydride, carboxylic acid ester, isocyanate, and mixtures thereof;
  (ii) compounds of the formulae (II) and (III)

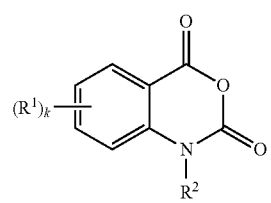
(II)

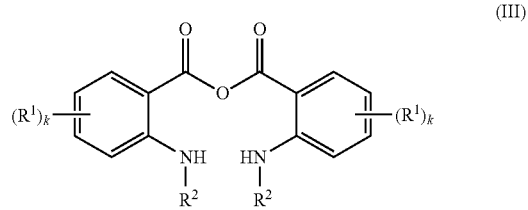
(III)

wherein
  k is 0, 1, 2, 3 or 4;
  $R^1$ is selected from the group consisting of halogen, OH, $NH_2$, $NHC_1$-$C_4$-alkyl, $N(C_1$-$C_4$-alkyl$)_2$, $C_1$-$C_4$-alkyl and $C_1$-$C_4$-alkoxy; and $R^2$ is selected from the group consisting of hydrogen and $C_1$-$C_4$-alkyl;
  (iii) lactones of the formula (IV)

(IV)

wherein A is a $C_3$-$C_{12}$-alkylene, which is unsubstituted or substituted by 1 or 2 radicals selected from OH, $C_1$-$C_4$-alkyl and $C_1$-$C_4$-alkoxy;
  iv) internal anhydride of the formula (V)

(V)

wherein D is a $C_2$-$C_6$-alkylene, which is unsubstituted or substituted by 1 or 2 radicals selected from OH, $C_1$-$C_4$-alkyl and $C_1$-$C_4$-alkoxy.

In a second aspect, the presently claimed invention is directed to a branched modified polyetheramine having a weight average molecular weight $M_w$ in the range of $\geq 1000$ g/mol to $\leq 100,000$ g/mol, which is obtained by reacting a mixture comprising
  a) at least one branched modified polyetheramine polyol is further modified with
  b) at least one compound B selected from
  i) compounds of formula (I)

R-Fg  (I)

wherein R is selected from the group consisting of
    linear or branched alkyl having at least 6 carbon atoms, wherein alkyl is unsubstituted or substituted by 1 or 2 radicals selected from OH and $C_1$-$C_4$-alkoxy;
    linear or branched alkenyl having at least 6 carbon atoms, wherein alkenyl is unsubstituted or substituted by 1 or 2 radicals selected from OH and $C_1$-$C_4$-alkoxy;
    a cycloaliphatic radical having at least 5 carbon atoms, wherein the cycloaliphatic radical is unsubstituted or substituted by 1 or 2 radicals selected, from OH, $C_1$-$C_4$-alkyl and $C_1$-$C_4$-alkoxy; and
    aryl and aryl-$C_1$-$C_4$-alkyl, wherein the aryl part is unsubstituted or substituted by 1, 2, 3, 4 or 5 radicals selected from halogen, OH, $NH_2$, $NHC_1$-$C_4$-alkyl, $N(C_1$-$C_4$-alkyl$)_2$, $C_1$-$C_4$-alkyl and $C_1$-$C_4$-alkoxy; and
  Fg is independently of one another, selected from the group consisting of carboxylic acid, hydroxy carboxylic acid, carboxylic acid anhydride, carboxylic acid ester, isocyanate, and mixtures thereof;

(ii) compounds of the formulae (II) and (III)

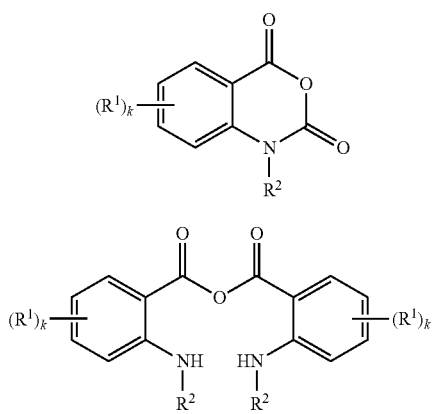

wherein
k is 0, 1, 2, 3 or 4;
R$^1$ is selected from the group consisting of halogen, OH, NH$_2$, NHC$_1$-C$_4$-alkyl, N(C$_1$-C$_4$-alkyl)$_2$, C$_1$-C$_4$-alkyl and C$_1$-C$_4$-alkoxy; and
R$^2$ is selected from the group consisting of hydrogen and C$_1$-C$_4$-alkyl;
(iii) lactones of the formula (IV)

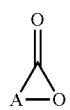

wherein A is a C$_3$-C$_{12}$-alkylene, which is unsubstituted or substituted by 1 or 2 radicals selected from OH, C$_1$-C$_4$-alkyl and C$_1$-C$_4$-alkoxy;
iv) internal anhydride of the formula (V)

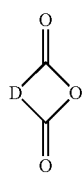

wherein D is selected from the group consisting of C$_2$-C$_6$ alkylene, C$_2$-alkenylene and 1,2-phenylene, where C$_2$-C$_6$ alkylene and C$_2$ alkenylene are unsubstituted or carry a C$_1$-C$_{18}$ alkyl or C$_1$-C$_{18}$ alkenyl radical and 1,2-phenylene is unsubstituted or substituted by 1 or 2 radicals selected from the group consisting of 1 or 2 radicals selected from OH, C$_1$-C$_4$-alkyl and C$_1$-C$_4$-alkoxy, —COOH or halogen.

In a third aspect, the presently claimed invention is directed to a liquid composition in the form of a dispersion comprising, a branched modified polyetheramine and/or a branched modified polyetheramine which is further modified with an at least one component B and a particulate solid material selected from the group consisting of pigments and fillers and a liquid diluent, wherein the particulate solid material is dispersed in the liquid diluent.

In a fourth aspect, the presently claimed invention is directed to the use of a branched modified polyetheramine and/or a branched modified polyetheramine which is further modified with an at least one component B and salts thereof as a dispersant for the particulate solid material selected from the group consisting of pigments and fillers.

DETAILED DESCRIPTION OF THE INVENTION

Before the present compositions and formulations of the presently claimed invention are described, it is to be understood that this invention is not limited to particular compositions and formulations described, since such compositions and formulation may, of course, vary. It is also to be understood that the terminology used herein is not intended to be limiting, since the scope of the presently claimed invention will be limited only by the appended claims.

If hereinafter a group is defined to comprise at least a certain number of embodiments, this is meant to also encompass a group which preferably consists of these embodiments only.

Furthermore, the terms 'first', 'second', 'third' or 'a', 'b', 'c', etc. and the like in the description and in the claims, are used for distinguishing between similar elements and not necessarily for describing a sequential or chronological order. It is to be understood that the terms so used are interchangeable under appropriate circumstances and that the embodiments of the presently claimed invention described herein are capable of operation in other sequences than described or illustrated herein. In case the terms 'first', 'second', 'third' or '(A)', '(B)' and '(C)' or '(a)', '(b)', '(c)', '(d)', 'i', 'ii' etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

Furthermore, the ranges defined throughout the specification include the end values as well i.e. a range of 1 to 10 implies that both 1 and 10 are included in the range. For the avoidance of doubt, applicant shall be entitled to any equivalents according to applicable law.

In the following passages, different aspects of the presently claimed invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to 'one embodiment' or 'an embodiment' means that a particular feature, structure or characteristic described in connection with the embodiment is included in at least one embodiment of the presently claimed invention. Thus, appearances of the phrases 'in one embodiment' or 'in an embodiment' in various places throughout this specification are not necessarily all referring to the same embodiment, but may.

Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the presently claimed invention, and form different embodiments, as would be understood by those in the art. For example, in the appended claims, any of the claimed embodiments can be used in any combination.

In one embodiment, the presently claimed invention is directed to a branched modified polyetheramine having a weight average molecular weight $M_w$ in the range of $\geq 1000$ g/mol to $\leq 100000$ g/mol, which is obtained by reacting a mixture comprising, a) at least one branched polyetheramine polyol P containing at least one hydroxyl group, having a weight average molecular weight $M_w$ in the range of $\geq 500$ g/mol to $\leq 10000$ g/mol and b) at least one compound B selected from— i) compounds of formula (I)

R-Fg  (I)

wherein R is selected from the group consisting of
linear or branched alkyl having at least 6 carbon atoms, wherein alkyl is unsubstituted or substituted by 1 or 2 radicals selected from OH and $C_1$-$C_4$-alkoxy;
linear or branched alkenyl having at least 6 carbon atoms, wherein alkenyl is unsubstituted or substituted by 1 or 2 radicals selected from OH and $C_1$-$C_4$-alkoxy;
a cycloaliphatic radical having at least 5 carbon atoms, wherein the cycloaliphatic radical is unsubstituted or substituted by 1 or 2 radicals selected, from OH, $C_1$-$C_4$-alkyl and $C_1$-$C_4$-alkoxy; and
aryl and aryl-$C_1$-$C_4$-alkyl, wherein the aryl part is unsubstituted or substituted by 1, 2, 3, 4 or 5 radicals selected from halogen, OH, $NH_2$, $NHC_1$-$C_4$-alkyl, $N(C_1$-$C_4$-alkyl$)_2$, $C_1$-$C_4$-alkyl and $C_1$-$C_4$-alkoxy; and Fg is independently of one another, selected from the group consisting of carboxylic acid, carboxylic acid anhydride, isocyanate, and mixtures thereof;

(ii) compounds of the formulae (II) and (III)

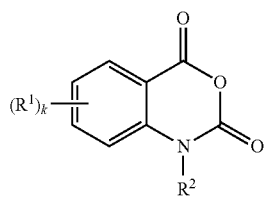
(II)

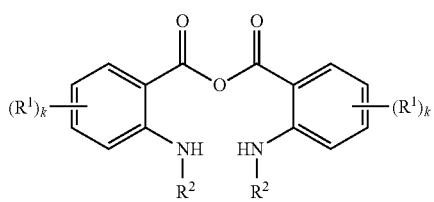
(III)

wherein
k is 0, 1, 2, 3 or 4;
$R^1$ is selected from the group consisting of halogen, OH, $NH_2$, $NHC_1$-$C_4$-alkyl, $N(C_1$-$C_4$-alkyl$)_2$, $C_1$-$C_4$-alkyl and $C_1$-$C_4$-alkoxy; and
$R^2$ is selected from the group consisting of hydrogen and $C_1$-$C_4$-alkyl;

(iii) lactones of the formula (IV)

(IV)

wherein A is a $C_3$-$C_{12}$-alkylene, which is unsubstituted or substituted by 1 or 2 radicals selected from OH, $C_1$-$C_4$-alkyl and $C_1$-$C_4$-alkoxy;

iv) internal anhydride of the formula (V)

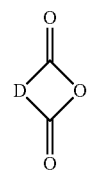
(V)

wherein D is selected from the group consisting of $C_2$-$C_6$ alkylene, $C_2$-alkenylene and 1,2-phenylene, where $C_2$-$C_6$ alkylene and $C_2$ alkenylene are unsubstituted or carry a $C_1$-$C_{18}$ alkyl or $C_1$-$C_{18}$ alkenyl radical and 1,2-phenylene is unsubstituted or substituted by 1 or 2 radicals selected from the group consisting of 1 or 2 radicals selected from OH, $C_1$-$C_4$-alkyl and $C_1$-$C_4$-alkoxy, —COOH or halogen.

In a preferred embodiment, the branched modified polyetheramine has a weight average molecular weight $M_w$ in the range of $\geq 1,000$ g/mol to $\leq 100,000$ g/mol, more preferably in the range of $\geq 1,000$ g/mol to $\leq 80,000$ g/mol, most preferably in the range of $\geq 1,000$ g/mol to $\leq 50,000$ g/mol, and particular preferably in the range of $\geq 1,000$ g/mol to $\leq 30,000$ g/mol.

In one embodiment of the present invention, the at least one branched polyetheramine polyol has at least one, preferably at least three, more preferably at least six, most preferably at least ten terminal functional groups per molecule. The functional groups in the context of the at least one branched polyetheramine polyol are, for example, amino groups, preferably secondary or tertiary amino groups, and hydroxyl groups. In principle there is no upper limit on the number of terminal or pendent functional groups. In one embodiment of the present invention, the at least one branched polyetheramine polyol (B) has no more than 500 terminal functional groups per molecule, preferably no more than 100.

In another preferred embodiment, the at least one branched polyetheramine polyol P containing at least one hydroxyl group, more preferably at least two hydroxyl groups, even more preferably at least three hydroxyl groups, still more preferably at least four hydroxyl groups and most preferably at least 5 hydroxyl groups. In another preferred embodiment, the at least one branched polyetheramine polyol P contains preferably $\geq 1$ to $\leq 50$ hydroxyl groups and most preferably $\geq 3$ to $\leq 30$ hydroxyl groups.

In a preferred embodiment, the at least one branched polyetheramine polyol P has a weight average molecular weight $M_w$ in the range of $\geq 500$ g/mol to $\leq 10,000$ g/mol, more preferably $\geq 500$ g/mol to $\leq 8,000$ g/mol, most preferably $\geq 500$ g/mol to $\leq 5,000$ g/mol, and most preferably $\geq 500$ g/mol to $\leq 3,000$ g/mol.

In a preferred embodiment, the branched polyetheramine polyol is prepared by subjecting at least one trialkanolamine and/or at least one dialkanolamine to polycondensation in presence of a catalysis at a temperature in the range of 100 to 500° C., and that said polycondensation is carried out, optionally in an atmosphere of an inert gas.

In a preferred embodiment, the at least one trialkanolamines will be subjected to polycondensation, for example selected from tri-$C_2$-$C_4$-alkanol-amines, with the alkanol groups in trialkanolamine being different or preferably identical. Trialkanolamine can be subjected to the polycondensation or to the co-polycondensation, either with one or more trialkanolamine or with one or more dialkanolamines. Examples for the suitable trialkanolamines are triethanolamine, tripropanolamine, triisopropanolamine and tributanolamine. Examples for the suitable dialkanolamines are N,N-diethanolamine, N,N-di-n-propanolamine, N,N-diisopropanolamine, N,N-di-n-butanolamine, N,N'—$C_2$-$C_8$-ω-hydroxyalkylpiperidine.

In a preferred embodiment, the branched polyetheramine polyol (B) can be obtained by the polycondensation of at least one of triethanolamine and/or diethanolamine, triisopropanolamine and/or tri-n-propanolamine, or mixtures of at least two of triethanolamine, triisopropanolamine and/or tri-n-propanolamine. Preference is given to make polyetheramine polyol (B) by the polycondensation of either triethanolamine or triisopropanolamine or a mixture of triethanolamine and triisopropanolamine.

In a preferred embodiment, the catalyst used is an acid. The acid is an inorganic or an organic acid, more preferably the acid is an inorganic acid.

In another preferred embodiment the inorganic acid is a mineral acid or a Lewis acid, more preferably, the acid is a mineral acid.

In another preferred embodiment, the mineral acid is selected from the group consisting of sulfuric acid, hydrochloric acid, phosphoric acid ($H_3PO_4$), phosphorous acid ($H_3PO_3$), phosphinic acid ($H_3PO_2$), perchloric acid, nitric acid, nitrous acid, sulphurous acid, chloric acid, chlorous acid and hypochlorous acid, more preferably the mineral acid is selected from sulfuric acid, phosphoric ($H_3PO_4$), phosphorous acid ($H_3PO_3$), phosphinic acid ($H_3PO_2$) and hydrochloric acid, even more preferably the mineral acid is sulfuric acid and phosphorous acid ($H_3PO_3$), phosphinic acid ($H_3PO_2$).

In another preferred embodiment, the Lewis acid is a metal-containing compound selected from the group consisting of a) $AsX_3$, $GaX_3$, $BX_3$, $BX_3$—$(C_2H_5)_2O$, $BX_3$—$S(CH_3)_2$, $AlX_3$, $(C_2H_5)_2AlX$, $SbX_3$, $SbX_5$, $SnX_2$, $MgX_2$, $MgX_2 \cdot O(C_2H_5)_2$, $ZnX_2$, $BiX_3$, $FeX_2$, $TiX_2$, $TiX_4$, $NbX_5$, $NiX_2$, $CoX_2$, $HgX_2$, whereby X in each case denotes F, Cl, Br, $SO_3$, $CF_3$—$SO_3$, $CH_3$—$SO_3$, or I;

b) $BH_3$, $B(CH_3)_3$, $GaH_3$, $AlH_3$, $Al(acetate)(OH)_2$, $Al[OCH(CH_3)_2]_3$, $Al(OCH_3)_3$, $Al(OC_2H_5)_3$, $Al_2O_3$, $(CH_3)_3Al$, $Ti[OCH(CH_3)_2]_3Cl$, $Ti[OCH(CH_3)_2]_4$, methylaluminum di-(2,6-di-tert-butyl-4-methylphenoxide), methylaluminum di-(4-brom-2,6-di-tert-butylphenoxide), $LiClO_4$;

c) $Mg(acetate)_2$, $Zn(acetate)_2$, $Ni(acetate)_2$, $Ni(NO_3)_2$, $Co(acetate)_2$, $Co(NO_3)_2$, $Cu(acetate)_2$, $Cu(NO_3)_2$, $Li(acetate)$, $Zr(acetylacetonate)_4$, $Si(acetate)_4$, $K(acetate)$, $Na(acetate)$, $Cs(acetate)$, $Rb(acetate)$, $Mn(acetate)_2$, $Fe(acetate)_2$, $Bi(acetate)_3$, $Sb(acetate)_3$, $Sr(acetate)_2$, $Sn(acetate)_2$, $Zr(acetate)_2$, $Ba(acetate)_2$, $Hg(acetate)_2$, $Ag(acetate)$, $Tl(acetate)_3$, $Sc(fluoromethansulfonate)_3$, $Ln(fluoromethanesulfonate)_3$, $Ni(fluoromethanesulfonate)_2$, $Ni(tosylate)_2$, $Co(fluoromethanesulfonate)_2$, $Co(tosylate)_2$, $Cu(fluoromethanesulfonate)_2$ and $Cu(tosylate)_2$.

In preferred embodiment, the branched polyetheramine polyol is prepared at a temperature in the range of 100 to 500° C., more preferably in the range of 100 to 400° C., most preferably in the range of 200 to 400° C., and particular preferably in the range of 200 to 300° C.

In another preferred embodiment, the inert gas is selected from nitrogen and noble gases such as argon.

In an embodiment, the at least one compound B is a compound of formula (I)

wherein R is selected from the group consisting of
linear or branched alkyl having at least 6 carbon atoms, wherein alkyl is unsubstituted or substituted by 1 or 2 radicals selected from OH and $C_1$-$C_4$-alkoxy;
linear or branched alkenyl having at least 6 carbon atoms, wherein alkenyl is unsubstituted or substituted by 1 or 2 radicals selected from OH and $C_1$-$C_4$-alkoxy;
a cycloaliphatic radical having at least 5 carbon atoms, wherein the cycloaliphatic radical is unsubstituted or substituted by 1 or 2 radicals selected, from OH, $C_1$-$C_4$-alkyl and $C_1$-$C_4$-alkoxy; and
aryl and aryl-$C_1$-$C_4$-alkyl, wherein the aryl part is unsubstituted or substituted by 1, 2, 3, 4 or 5 radicals selected from halogen, OH, $NH_2$, $NHC_1$-$C_4$-alkyl, $N(C_1$-$C_4$-alkyl$)_2$, $C_1$-$C_4$-alkyl and $C_1$-$C_4$-alkoxy;
more preferably R is selected from the group consisting of
linear or branched alkyl having at least 6 carbon atoms, wherein alkyl is unsubstituted;
linear or branched alkenyl having at least 6 carbon atoms, wherein alkenyl is unsubstituted;
a cycloaliphatic radical having at least 5 carbon atoms, wherein the cycloaliphatic radical is unsubstituted or substituted by $C_1$-$C_4$-alkyl and $C_1$-$C_4$—; and
aryl and aryl-$C_1$-$C_4$-alkyl, wherein the aryl part is unsubstituted or substituted by 1, 2, 3, 4 or 5 radicals selected from halogen, OH, $NH_2$, $NHC_1$-$C_4$-alkyl, $N(C_1$-$C_4$-alkyl$)_2$, $C_1$-$C_4$-alkyl and $C_1$-$C_4$-alkoxy;
most preferably R is selected from the group consisting of
linear or branched alkyl having at least 6 carbon atoms, wherein alkyl is unsubstituted;
linear or branched alkenyl having at least 6 carbon atoms, wherein alkenyl is unsubstituted;
a cycloaliphatic radical having at least 5 carbon atoms, wherein the cycloaliphatic radical is unsubstituted or substituted by $C_1$-$C_4$-alkyl and $C_1$-$C_4$—; and
particular preferably R is selected from the group consisting of
linear or branched alkyl having at least 6 carbon atoms, wherein alkyl is unsubstituted; and
linear or branched alkenyl having at least 6 carbon atoms, wherein alkenyl is unsubstituted.

In a preferred embodiment, R is a linear or a branched alkyl having at least 6 carbon atoms, wherein the alkyl is unsubstituted or substituted by 1 or 2 radicals selected from OH and $C_1$-$C_4$-alkoxy. More preferably R is a linear or a branched alkyl having 6 to 40 carbon atoms, wherein the alkyl is unsubstituted or substituted by 1 or 2 radicals selected from OH and $C_1$-$C_4$-alkoxy, even more preferably, R is a linear or a branched alkyl having 6 to 30 carbon atoms, wherein the alkyl is unsubstituted or substituted by 1 or 2 radicals selected from OH and $C_1$-$C_4$-alkoxy, most preferably, R is a linear or a branched alkyl having 10 to 30 carbon atoms, wherein the alkyl is unsubstituted or substituted by 1 or 2 radicals selected from OH and $C_1$-$C_4$-alkoxy, and in particular preferably R is a linear or a branched alkyl having 6 to 30 carbon atoms.

Within the context of the presently claimed invention, the term "alkyl", as used herein, refers to an acylic saturated aliphatic groups, including a linear or a branched alkyl saturated hydrocarbon radical denoted by a general formula $C_nH_{2n+1}$ and wherein n is the number of carbon atoms 1, 2, 3, 4 etc. The examples of the linear and the branched unsubstituted alkyl having at least 6 carbon atoms are, but not limited to, hexyl, heptyl, octyl, nonyl, decyl, undecyl, dodecyl, tridecyl, tetradecyl, pentadecyl, hexadecyl, octadecyl, nonadecyl and eicosyl; more preferably selected from the group consisting of hexyl, heptyl, octyl, nonyl, decyl, undecyl, dodecyl, tridecyl, tetradecyl, pentadecyl, hexadecyl, heptadecyl, octadecyl, nonadecyl, 2-ethyl-hexyl, 2-propyl-heptyl, 2-butyl-octyl, 2-pentyl-nonyl, 2-hexyl-decyl, iso-hexyl, iso-heptyl, iso-octyl, iso-nonyl, iso-decyl, iso-dodecyl, iso-tetradecyl, iso-hexadecyl, iso-octadecyl and iso-eicosyl, more preferably selected from the group consisting of 2-ethyl-hexyl, 2-propyl-heptyl, 2-butyl-octyl, 2-pentyl-nonyl, 2-hexyl-decyl, iso-hexyl, iso-heptyl, iso-octyl, iso-nonyl, iso-decyl, iso-dodecyl, iso-tetradecyl, iso-hexadecyl, iso-octadecyl and iso-eicosyl.

In another preferred embodiment, the compound of formula R-Fg (I) does not include stearic acid ($C_{17}H_{35}$COOH).

The representative examples of the linear or the branched alkyl having at least 6 carbon atoms, substituted by 1 or 2 radicals selected from OH and $C_1$-$C_4$-alkoxy are, but not limited to, 2-hydroxy-hexyl, 2,3-dihydroxy-hexyl, 3-hydroxy-2-methoxyhexyl, 2-hydroxy-heptyl, 2,3-dihydroxy-heptyl, 3-hydroxy-2-methoxyheptyl, 2,3-dimethoxyheptyl, 2-ethoxy-3-methoxy-heptyl, 2-isopropoxy-3-methoxy-heptyl, 2,3-diisopropoxyheptyl, 3-hydroxy-2-methoxyoctyl, 2,3-dimethoxyoctyl, 2-ethoxy-3-methoxy-octyl, 2-isopropoxy-3-methoxy-octyl, 2,3-diisopropoxyoctyl, 3-hydroxy-5-methoxyoctyl, 2,5-dimethoxyoctyl, 5-ethoxy-3-methoxy-octyl, 5-isopropoxy-5-methoxy-octyl, 4,7-diisopropoxyoctyl, 3-hydroxy-2-methoxynonayl, 2,3-dimethoxynonayl, 2-ethoxy-3-methoxy-nonayl, 2-isopropoxy-3-methoxy-nonayl, 2,3-diisopropoxynonayl, 3-hydroxy-2-methoxy dodecyl, 2,3-dimethoxy dodecyl, 2-ethoxy-3-methoxy-dodecyl, 2-isopropoxy-3-methoxy-dodecyl, 2,3-diisopropoxy dodecyl, 3-hydroxy-2-methoxy dodecyl, 2,3-dimethoxy octadecyl, 2-ethoxy-3-methoxy-octadecyl, 2-isopropoxy-3-methoxy-octadecyl, 2,3-diisopropoxy octadecyl, 3-hydroxy-5-methoxy octadecyl, 2,5-dimethoxy octadecyl, 5-ethoxy-3-methoxy-octadecyl, 5-isopropoxy-5-methoxy-octadecyl, 4,7-diisopropoxy octadecyl, 3-hydroxy-2-methoxy octadecyl, 2,3-dimethoxy octadecyl, 2-ethoxy-3-methoxy-octadecyl, 2-isopropoxy-3-methoxy-octadecyl, 2,3-diisopropoxy octadecyl, 4-hydroxy-8-methoxydodecyl, 12,3-dimethoxydodecyl, 2-ethoxy-13-methoxy-dodecyl, 12-isopropoxy-3-methoxy-dodecyl, 2,3-diisopropoxydodecyl, 3-hydroxy-2-methoxydodecyl, 2,3-dimethoxyoctadecyl, 2-ethoxy-13-methoxy-octadecyl, 12-isopropoxy-3-methoxy-octadecyl, 15,13-diisopropoxyoctadecyl, 13-hydroxy-5-methoxyoctadecyl, 2,15-dimethoxyoctadecyl, 15-ethoxy-3-methoxy-octadecyl, 15-isopropoxy-15-methoxy-octadecyl, 14,7-diisopropoxyoctadecyl, 3-hydroxy-12-methoxyoctadecyl, 2,13-dimethoxyoctadecyl, 12-ethoxy-15-methoxy-octadecyl, 7-isopropoxy-31-methoxy-octadecyl, 16,15-diisopropoxyoctadecyl.

In a preferred embodiment, R is a linear or a branched alkenyl having at least 6 carbon atoms, wherein the alkenyl is unsubstituted or substituted by 1 or 2 radicals selected from OH and $C_1$-$C_4$-alkoxy. Within the context of the presently claimed invention, the term "alkenyl", as used herein, refers to an acylic unsaturated aliphatic groups, including linear or branched alkenyl unsaturated hydrocarbon radical having at least one double bond. The alkenyl can have more than one double bond such as 2, 3, 4 etc. The double bonds may be conjugated (—C=C—C=C—) or isolated (—C=C—C—C=C—) or the double bonds can be on same carbon (—C—C=C=C—C).

In a preferred embodiment, R is a linear or a branched alkenyl having at least 6 carbon atoms, wherein the alkenyl is unsubstituted or substituted by 1 or 2 radicals selected from OH and $C_1$-$C_4$-alkoxy. More preferably R is a linear or a branched alkenyl having 6 to 40 carbon atoms, wherein the alkenyl is unsubstituted or substituted by 1 or 2 radicals selected from OH and $C_1$-$C_4$-alkoxy, even more preferably, R is a linear or a branched alkenyl having 6 to 30 carbon atoms, wherein the alkenyl is unsubstituted or substituted by 1 or 2 radicals selected from OH and $C_1$-$C_4$-alkoxy, most preferably, R is a linear or a branched alkenyl having 10 to 30 carbon atoms, wherein the alkenyl is unsubstituted or substituted by 1 or 2 radicals selected from OH and $C_1$-$C_4$-alkoxy, and in particular preferably R is a linear or a branched alkenyl having 6 to 30 carbon atoms.

The representative examples of the linear and the branched alkenyl containing at least one double bond include, but are not limited to, 1-hexenyl, 2-hexenyl, 1-heptenyl, 2-heptenyl, 1-octenyl, 2-octenyl, 1-nonenyl, 2-nonenyl, 1-decenyl, 2-decenyl, 1-undecenyl, 2-undecenyl, 1-dodecenyl, 2-dodecenyl, 1-tridecenyl, 2-tridecenyl, 1-tetradecenyl, 2-tetradecenyl, 1-pentadecenyl, 2-pentadecenyl, 1-hexadecenyl, 2-hexadecenyl, 1-heptadecenyl, 2-heptadecenyl, 1-octadecenyl, 2-octadecenyl, 1-nonadecenyl, 2-nonadecenyl, 1-eicosenyl 2-eicosenyl, 1,4-hexadienyl, 1,3-hexadienyl, 2,5-hexadienyl, 3,5-hexadienyl, 2,4-hexadienyl, 1,3,5-hexatrienyl, 1,3,6-heptatrienyl, 1,4,7-octatrienyl or 2-methyl-1,3,5hexatrienyl, 1,3,5,7-octatetraenyl, 1,3,5,8-nonatetraenyl, 1,4,7,10-undecatetraenyl, 2-ethyl-1,3,6,8-nonatetraenyl, 2-ethenyl-1,3,5,8-nonatetraenyl, 1,3,5,7,9-decapentaenyl, 1,4,6,8,10-undecapentaenyl, 1,4,6,9,11-dodecapentaenyl, 1-hexenyl, 2-hexenyl, 1-heptenyl, 2-heptenyl, 1-octenyl, 2-octenyl, 1-nonenyl, 2-nonenyl, 1-decenyl, 2-decenyl, 1-undecenyl, 2-undecenyl, 1-dodecenyl, 2-dodecenyl, 1-tridecenyl, 2-tridecenyl, 1-tetradecenyl, 2-tetradecenyl, 1-pentadecenyl, 2-pentadecenyl, 1-hexadecenyl, 2-hexadecenyl, 1-heptadecenyl, 2-heptadecenyl, 1-octadecenyl, 2-octadecenyl, 1-nonadecenyl, 2-nonadecenyl, 1-eicosenyl 2-eicosenyl, 1,4-hexadienyl, 1,3-hexadienyl, 2,5-hexadienyl, 3,5-hexadienyl, 2,4-hexadienyl, 1,3,5-hexatrienyl, 1,3,6-heptatrienyl, 1,4,7-octatrienyl or 2-methyl-1,3,5hexatrienyl, 1,3,5,7-octatetraenyl, 1,3,5,8-nonatetraenyl, 1,4,7,10-undecatetraenyl, 2-ethyl-1,3,6,8-nonatetraenyl, 2-ethenyl-1,3,5,8-nonatetraenyl, 1,3,5,7,9-decapentaenyl, 1,4,6,8,10-undecapentaenyl, 1,4,6,9,11-dodecapentaenyl, 2-ethyl-hexyl, 2-propyl-heptyl, 2-butyl-octyl, 2-pentyl-nonyl, 2-hexyl-decyl, iso-hexyl, iso-heptyl, iso-octyl, iso-nonyl, iso-decyl, iso-dodecyl, iso-tetradecyl, iso-hexadecyl, iso-octadecyl and iso-eicosyl.

The examples of the linear or the branched alkenyl having at least 6 carbon atoms, substituted by 1 or 2 radicals selected from OH and $C_1$-$C_4$-alkoxy are, but not limited to, 2-hydroxy-hex-3-en-3-yl, 2,3-dihydroxy-hex-5-en-1-yl, 3-hydroxy-5-methoxyhex-1-en-2-yl, 2-hydroxy-hept-6-en-3-yl, 2,3-dihydroxy-hept-4-en-6-yl, 2,3-dihydroxy-hept-4-en-1-yl, 3-hydroxy-2-methoxyhept-4-en-1-yl, 2,3-dimethoxyhept-5-en-4-yl, 2-ethoxy-3-methoxy-hept-6-en-6-yl, 2-isopropoxy-3-methoxy-hept-4-en-7-yl, 2,3-diisopropoxyhept-6-en-5-yl, 3-hydroxy-2-methoxyoct-5-en-7-yl, 2,3-dimethoxyoct-7-en-5-yl, 2-ethoxy-3-methoxy-oct-6-en-8-yl, 2-isopropoxy-3-methoxy-oct-6-en-8-yl, 2,3-diisopropoxyoct-5-en-8-yl, 3-hydroxy-5-methoxyoct-4-en-1-yl, 2,5-dimethoxyoct-3-en-7-yl, 5-ethoxy-3-methoxy-oct-2-en-7-yl, 5-isopropoxy-5-methoxy-oct-2-en-1-yl, 4,7-diisopropoxyoct-3-en-1-yl, 3-hydroxy-2-methoxynon-5-en-9-yl, 2,3-dimethoxynon-4-en-5-yl, 2-ethoxy-3-methoxy-non-6-en-9-yl, 2-isopropoxy-3-methoxy-non-4-en-7-yl, 10-ethoxy-3-methoxy-dodec-5-enyl, 8-propoxy-3-methoxy-dodec-11-enyl, 8-isopropoxy-3-methoxy-dodec-11-enyl, 2,3-diisopropoxydodec-4-en-8-yl, 3-hydroxy-2-methoxydodec-7-en-12-yl, 2,3-dimethoxy octadic-5-en-11-yl, 2-ethoxy-3-methoxy-octadec-6-en-17-yl, 2-isopropoxy-3-methoxy-octadic-12-en-1-yl, 2,3-diisopropoxyoctadec-5-en-18-yl, 3-hydroxy-5-methoxyoctadec-17-en-10-yl, 2,5-dimethoxyoctadec-2-en-18-yl, 5-ethoxy-3-methoxy-octadec-2-en-18-yl, 5-isopropoxy-5-methoxy-octadec-16-en-1-yl, 4,7-diisopropoxy octadic-3-en-1-yl, 14,7-diisopropoxyoctadec-3-en-1-yl.

In a preferred embodiment, R is a cycloaliphatic radical having at least 5 carbon atoms, wherein the cycloaliphatic radical is unsubstituted or substituted by 1 or 2 radicals selected, from OH, $C_1$-$C_4$-alkyl and $C_1$-$C_4$-alkoxy. The cycloaliphatic can be a monocyclic and a bicyclic. The representative examples of the unsubstituted and the branched cycloaliphatic are, but not limited to cyclopentyl, cyclohexyl, cycloheptyl, bicyclo[2.2.1]heptyl and bicyclo[3.1.1]heptyl. The representative examples of cycloaliphatic substituted with OH include, but are not limited to 2-hydroxy-pentyl, 2,4-dihydroxycyclohexyl, 3,6-dihydrocycloheptyl, etc. The cycloaliphatic that are optionally substituted with $C_1$-$C_4$-alkyl. The representative examples of the cycloaliphatic substituted with $C_1$-$C_4$ alkyl include, but are not limited to methyl cyclohexyl, dimethyl cyclohexyl etc. The term "alkoxy" as used herein denotes in each case, is a straight-chain or branched alkyl group usually having from 1 to 4 carbon atoms ("$C_1$-$C_4$-alkoxy") which is bound to the remainder of the molecule via an oxygen atom. $C_1$-$C_2$-Alkoxy is methoxy or ethoxy. The $C_1$-$C_4$-Alkoxy is additionally, for example, is selected from, but not limited to, n-propoxy, 1-methylethoxy (isopropoxy), butoxy, 1-methylpropoxy (sec-butoxy), 2-methylpropoxy (isobutoxy) or 1,1-dimethylethoxy (tert-butoxy). The representative examples of the cycloaliphatic substituted with $C_1$-$C_4$ alkoxy include, but are not limited to methoxycyclohexyl, 2,3-dimethoxy cyclohexyl, 2,3-diethoxy cyclohexyl, 2,4-dimethoxy cyclohexyl, 2,5-diethoxy cyclohexyl, 2,3-dipropoxy cyclohexyl etc. Further examples include, but not limited to, are 2-hydroxy-4-methoxy cyclohexyl, 3-hydroxy-5-methylcyclohexyl, 2-methyl-4-methoxy cyclohexyl etc.

In a preferred embodiment, R is an aryl and an aryl-$C_1$-$C_4$-alkyl, wherein the aryl part is unsubstituted or substituted by 1, 2, 3, 4 or 5 radicals selected from halogen, OH, $NH_2$, $NHC_1$-$C_4$-alkyl, $N(C_1$-$C_4$-alkyl$)_2$, $C_1$-$C_4$-alkyl and $C_1$-$C_4$-alkoxy. The representative examples of the aryl and the aryl-$C_1$-$C_4$-alkyl, wherein the aryl part is unsubstituted are phenyl, 1-phenylmethyl, 1-phenylethyl, 1-phenylpropyl, 1-phenylbutyl, 1-methyl-1-phenyl-propyl, 3-phenylpropyl, 4-phenylbutyl, 3-phenylbutyl, 2-methyl-3-phenyl-propyl etc. The representative examples of the aryl and the aryl-$C_1$-$C_4$-alkyl substituted by 1, 2, 3, 4 or 5 radicals selected from halogen, OH, $NH_2$, NH—$C_1$-$C_4$-alkyl, $N(C_1$-$C_4$-alkyl$)_2$, $C_1$-$C_4$-alkyl and $C_1$-$C_4$-alkoxy include, but not limited to, 3-hydroxyphenyl, 2,5-dihydroxyphenyl, 5-amino-2-hydroxy-phenyl, 3-(dimethylamino)-2-hydroxy-phenyl, 5-(dimethylamino)-3-hydroxy-phenyl, 3-(diethylamino)-4-hydroxy-phenyl, 5-methylamino-2-hydroxy-phenyl, 5-(dimethylamino)-2-hydroxy-4-methyl-phenyl, 2-hydroxy-4-ethyl-5-(methylamino)phenyl, 2-hydroxy-5-methoxy-4-methyl-phenyl, 3-methoxy-4-methyl-phenyl, 2-methoxy-4-methyl-phenyl, 3-isopropoxyphenyl, 3-(isopropylamino)phenyl, 3-amino-5-(isopropylamino)phenyl, 3-hydroxy-5-(isopropylamino)phenyl, 3-hydroxy-2-(isopropylamino)phenyl, 3-chloro-5-(isopropylamino)phenyl, 2,3-dichloro-5-(isopropylamino)phenyl, 2,3-dichloro-5-isopropoxy-phenyl, 2,3-dichlorophenyl, 3-chloro-2-hydroxyphenyl, 3-chloro-2-methoxy-phenyl, 2-(4-hydroxy-2-methoxy-phenyl)ethyl, 2-(4-hydroxy-2-methoxy-phenyl)butyl, 2-(2,4-dimethoxyphenyl)ethyl, 2-(2,6-dimethoxyphenyl)ethyl, 2-(2,4-dimethoxyphenyl)propyl, 2-[4-methoxy-2-(methylamino)phenyl]ethyl, 2-[2-(dimethylamino)-4-methoxy-phenyl]ethyl, 2-[2-(dimethylamino)-4-(methylamino)phenyl]ethyl, 2-[2-(dimethylamino)-4-methoxy-phenyl]ethyl, 2-[3-(dimethylamino)-4-ethyl-phenyl]ethyl, 2-[5-methoxy-2-(methylamino)phenyl]propyl, 2-[2-(dimethylamino)-4-methoxy-phenyl]methyl, 2-[2-(dimethylamino)-5-(methylamino)phenyl]butyl, 2-[2-(dimethylamino)-3-methoxy-phenyl]methyl, 2-[2-(dimethylamino)-3-ethyl-phenyl]propyl, 2-[2-(dimethylamino)-5-sec-butyl-phenyl]ethyl, 2-[2-(dimethylamino)-5-sec-butyl-phenyl]methyl, 2-[2-(dimethylamino)-4-sec-butyl-phenyl]butyl, 2-(2-chloro-4-sec-butyl-phenyl)ethyl, 2-(2-chloro-4-sec-butyl-phenyl)butyl, etc.

In a preferred embodiment the Fg is at least one functional group selected from the group consisting of a carboxylic acid, a carboxylic acid anhydride, carboxylic acid ester, an isocyanate, and mixtures thereof; more preferably Fg is at least functional group selected from a carboxylic acid, and a carboxylic acid anhydride.

The representative examples of the compounds of formula (I) are, but not limited to, caproic acid, enanthic acid, caprylic acid, pelargonic acid, capric acid, undecylic acid, lauric acid, tridecylic acid, myristic acid, pentadecylic acid, palmitic acid, margaric acid, nonadecylic acid, arachidic acid, heneicosylic acid, behenic acid, tricosylic acid, α-linolenic acid, myristoleic acid, palmitoleic acid, sapienic acid, oleic acid, elaidic acid, vaccenic acid, gadoleic, eicosenoic acid, erucic acid, linoleic acid, eicosadienoic acid, docosadienoic acid, α-linolenic acid, γ-linolenic acid, pinolenic acid, eleostearic acid, β-eleostearic acid, mead acid, dihomo-γ-linolenic acid, eicosatrienoic acid, stearidonic acid, arachidonic acid, eicosatetraenoic acid, adrenic acid, bosseopentaenoic acid, eicosapentaenoic acid, ozubondo acid, sardine acid, tetracosanolpentaenoic acid, docosahexaenoic acid, herring acid, myristic acid, palmitic acid, arachidic acid, behenic acid, linoleic acid, linolenic acid, oleic acid, and mixtures of acids based on natural products such as sunflower oil, tallow oil and tall oil fatty acids, benzoin acid, 2-methyl benzoic acid, 2,3-diisopropoxy octadecanoic acid, 3-hydroxy-5-methoxy octadecanoic acid, 2,5-dimethoxy octadecanoic acid, 5-ethoxy-3-methoxy-octadecanoic acid, 5-isopropoxy-5-methoxy-octadecanoic acid, 4,7-diisopropoxy octadecanoic acid, 3-hydroxy-2-methoxy octadecanoic acid, 2,3-dimethoxy octadecanoic acid, 2-ethoxy-3-methoxy-octadecanoic acid, 2-isopropoxy-3-methoxy-octadic-12-en-1-oic acid, 2,3-diisopropoxyoctadec-5-en-18-oic acid, 3-hydroxy-5-methoxyoctadec-17-en-10-oic acid, 2,5-dimethoxyoctadec-2-en-18-oic acid, 5-ethoxy-3-methoxy-octadec-2-en-18-oic acid, 5-isopropoxy-5-methoxy-octadec-16-en-1-oic acid, 4,7-diisopropoxy octadic-3-en-1-oic acid, 14,7-diisopropoxyoctadec-3-en-1-oic acid, cyclopentanoic acid, cyclohexanoic acid, cycloheptanoic acid, bicyclo[2.2.1]heptanoic acid, bicyclo

[3.1.1]heptanoic acid, 2-hydroxy-4-methoxy cyclohexanoic acid, 3-hydroxy-5-methylcyclohexanoic acid, 2-methyl-4-methoxy cyclohexanoic acid, 1-phenylmethanoic acid, 1-phenylethanoic acid, 1-phenylpropanoic acid, 1-phenylbutanoic acid, 1-methyl-1-phenyl-propanoic acid, 3-phenylpropanoic acid, 4-phenylbutanoic acid, 3-phenylbutanoic acid, 2-methyl-3-phenyl-propanoic acid, 3-methoxy-4-methyl-phenanoic acid, 2-methoxy-4-methyl-phenanoic acid, 3-isopropoxyphenanoic acid, 3-(isopropylamino) phenanoic acid, 3-amino-5-(isopropylamino)phenanoic acid, 3-hydroxy-5-(isopropylamino)phenanoic acid, 3-hydroxy-2-(isopropylamino)phenanoic acid, 3-chloro-5-(isopropylamino)phenanoic acid, 2,3-dichloro-5-(isopropylamino)phenanoic acid, 2-[2-(dimethylamino)-4-methoxy-phenyl]ethanoic acid, 2-[2-(dimethylamino)-4-(methylamino)phenyl]ethanoic acid, 2-[2-(dimethylamino)-4-methoxy-phenyl]ethanoic acid, 2-[3-(dimethylamino)-4-ethyl-phenyl]ethanoic acid, 2-[5-methoxy-2-(methylamino)phenyl]propanoic acid, 2-[2-(dimethylamino)-4-methoxy-phenyl]methanoic acid, 2-[2-(dimethylamino)-5-(methylamino)phenyl]butanoic acid, 2-[2-(dimethylamino)-3-methoxy-phenyl]methanoic acid, 2-[2-(dimethylamino)-3-ethyl-phenyl]proanoic acid, 2-[2-(dimethylamino)-5-sec-butyl-phenyl]ethanoic acid, 2-[2-(dimethylamino)-5-sec-butyl-phenyl]methanoic acid, 2-[2-(dimethylamino)-4-sec-butyl-phenyl]butanoic acid, 2-(2-chloro-4-sec-butyl-phenyl) ethanoic acid, 2-(2-chloro-4-sec-butyl-phenyl)butanoic acid.

In an embodiment, the at least one compound B is compounds of formulae (II) and (III)

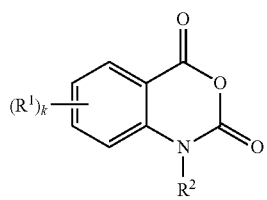

(II)

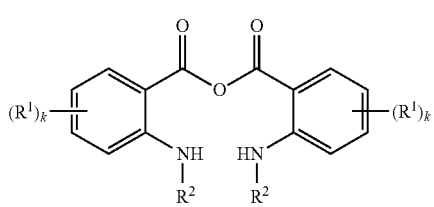

(III)

wherein k is 0, 1, 2, 3 or 4;

$R^1$ is selected from the group consisting of halogen, OH, $NH_2$, $NH$—$C_1$-$C_4$-alkyl, $N(C_1$-$C_4$-alkyl$)_2$, $C_1$-$C_4$-alkyl and $C_1$-$C_4$-alkoxy; and $R^2$ is selected from the group consisting of hydrogen and $C_1$-$C_4$-alkyl;

more preferably k is 0, 1, 2, or 3;

$R^1$ is selected from the group consisting of halogen, $N(C_1$-$C_4$-alkyl$)_2$, $C_1$-$C_4$-alkyl and $C_1$-$C_4$-alkoxy; and $R^2$ is selected from the group consisting of hydrogen and $C_1$-$C_4$-alkyl;

most preferably, k is 0 or 1;

$R^1$ is selected from the group consisting of halogen, $C_1$-$C_4$-alkyl and $C_1$-$C_4$-alkoxy; and $R^2$ is selected from the group consisting of hydrogen and $C_1$-$C_4$-alkyl.

Within the context of the present invention the representative examples of $R^1$ substituents of the compounds of the formulae (II) and (III) are, but not limited to, NH—$C_1$-$C_4$-alkyl and $N(C_1$-$C_4$-alkyl$)_2$ are, but not limited to, methylamino, dimethylamino, ethylamino, diethylamino, propylamino, ethylmethylamino, methylbutylamino, dibutylamino, butylamino etc.

Within the context of the present invention the representative examples of $R^1$ substituents of the compounds of the formulae (II) and (III) are, but not limited to, $C_1$-$C_4$-alkyl are methyl, ethyl, propyl, isopropyl, butyl, isobutyl and the representative examples of the $C_1$-$C_4$-alkoxy are methoxy, ethoxy, propoxy, isopropoxy, iosbutoxy, butoxy etc.

Examples for the suitable compounds of the formula II are isatoic anhydride, fluoroisatoic anhydride, chloroisatoic anhydride, bromoisatoic anhydride, nitroisatoic anhydride, hydroxyisatoic anhydride, methoxyisatoic anhydride, N-methylisatoic anhydride, N-ethylisatoic anhydride, aminoisatoic anhydride, (4-pyridinyl)isatoic anhydride. An example of a suitable compounds of the formula III is the anhydride of anthranilic acid, i.e. k=0.

The representative examples of the compounds of the formulae (II) and (III) are, but not limited to, isatoic anhydride, N-methylisatoic anhydride, N-ethylisatoic anhydride, aminoisatoic anhydride, fluoroisatoic anhydride, chloroisatoic anhydride, bromoisatoic anhydride, carboxylic isatoic anhydride, nitroisatoic anhydride, hydroxyisatoic anhydride, methoxyisatoic anhydride, 1-(methylsulfonylmethyl)isatoic anhydride, (4-pyridinyl)isatoic anhydride, 1-phenyl-2H-3,1-benzoxazine-2,4(1H)-dione, chloro-1-ethyl (methyl)-2H-3,1-benzoxazine-2,4(1H)-dione, isatoic anhydride carboxylic acid methyl ester.

In an embodiment, the at least one compound B is lactones of the formula (IV)

(IV)

wherein

A is a $C_3$-$C_{12}$-alkylene, which is unsubstituted or substituted by 1 or 2 radicals selected from OH, $C_1$-$C_4$-alkyl and $C_1$-$C_4$-alkoxy;

more preferably A is a $C_3$-$C_{10}$-alkylene, which is unsubstituted or substituted by 1 or 2 radicals selected from OH, $C_1$-$C_4$-alkyl and $C_1$-$C_4$-alkoxy;

most preferably A is a $C_5$-$C_{10}$-alkylene, which is unsubstituted or substituted by 1 or 2 radicals selected from OH, $C_1$-$C_4$-alkyl and $C_1$-$C_4$-alkoxy, even more preferably A is a $C_5$-$C_8$-alkylene, which is unsubstituted or substituted by 1 or 2 radicals selected from OH, $C_1$-$C_4$-alkyl and $C_1$-$C_4$-alkoxy;

particularly A is a $C_5$-$C_8$-alkylene, which is unsubstituted or substituted by 1 or 2 radicals selected from $C_1$-$C_4$-alkyl and $C_1$-$C_4$-alkoxy; and even particular preferably A is an unsubstituted $C_5$-$C_8$-alkylene.

Within the context of the present invention, in the lactones of the formula (IV), the term alkylene refers to an acyclic saturated hydrocarbon chains. The representative examples of the $C_3$-$C_{12}$-alkylene, which is unsubstituted or substituted by 1 or 2 radicals are selected from OH, $C_1$-$C_4$-alkyl and $C_1$-$C_4$-alkoxy groups include, but are not limited to, —$CH_2$—$CH_2$—$CH_2$—, —$(CH_2)$—, —$(CH_2)_5$—, —$(CH_2)_6$—, —$(CH_2)_8$—, —$(CH_2)_{10}$—, —$CH_2$—$CH(CH_3)$—$CH_2$—, —$CH_2$—$CH(CH_2CH_3)$—, —$CH_2$—$C(CH_3)_2$—$CH_2$—, and —$CH_2$—$[C(CH_3)_2]_2$—$CH_2$—, —$CH_2$—$CH(OCH_2CH_3)$—$CH_2$—, —$CH_2$—$CH(OH)$—$CH_2$—, —$CH_2$—$CH(OH)$—$CH_2$—$CH_2$—, —$CH_2$—$CH(OH)$—$CH_2$—$CH_2$—$CH_2$—, —$CH_2$—$C(OH)(CH_3)$—$CH_2$—, —$CH_2$—$CH(CH_2CH_3)$—$CH_2$—, —$CH_2$—$C(CH_3)_2$—$CH_2$—, —$CH_2$—$[C(CH_3)_2]_2$—$CH_2$—, —$CH_2$—$[C(OCH_3)_2]_2$—$CH_2$—, —$CH_2$—$[C(OCH_2CH_3)_2]_2$—$CH_2$—, etc.

The representative examples of the lactones of the formula (IV) are, but not limited to, oxetan-2-one, 4-methyloxetan-2-one, butyrolactone, caprolactone, 4-methyltetrahydropyran-2-one, valerolactone, tetrahydropyran-2-one, 3-methyltetrahydropyran-2-one, 3,6-dimethyltetrahydropyran-2-one, 6-methyltetrahydropyran-2-one, or a mixture thereof.

In an embodiment, the at least one compound B is an internal anhydride of the formula (V)

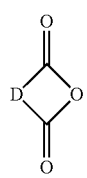

(V)

wherein D is selected from the group consisting of $C_2$-$C_6$ alkylene, $C_2$-alkenylene and 1,2-phenylene, where $C_2$-$C_6$ alkylene and $C_2$ alkenylene are unsubstituted or carry a $C_1$-$C_{18}$ alkyl or $C_1$-$C_{18}$ alkenyl radical and 1,2-phenylene is unsubstituted or substituted by 1 or 2 radicals selected from the group consisting of 1 or 2 radicals selected from OH, $C_1$-$C_4$-alkyl and $C_1$-$C_4$-alkoxy, —COOH or halogen; more preferably a $C_2$-$C_6$-alkylene, which is unsubstituted or substituted by 1 or 2 radicals selected from OH, $C_1$-$C_4$-alkyl and $C_1$-$C_4$-alkoxy.

Within the context of the present invention, in the internal anhydride of the formula (V), the term alkylene refers to an acyclic saturated hydrocarbon chains. Representative examples of the $C_2$-$C_6$-alkylene, which is unsubstituted or substituted by 1 or 2 radicals selected from OH, $C_1$-$C_4$-alkyl and $C_1$-$C_4$-alkoxy groups include, but are not limited to, —$CH_2$—$CH_2$—, —$CH_2$—$CH_2$—$CH_2$—, —$(CH_2)_4$—, —$(CH_2)_5$—, —$(CH_2)_6$—, —$CH_2$—$CH(CH_3)$—$CH_2$—, —$CH_2$—$CH(CH_2CH_3)$—, —$CH_2$—$C(CH_3)_2$—$CH_2$—, —$CH_2$—$[C(CH_3)_2]_2$—$CH_2$—, —$CH_2$—$CH(OCH_2CH_3)$—$CH_2$—, —$CH_2$—$CH(OH)$—$CH_2$—, —$CH_2$—$C(OH)(CH_3)$—$CH_2$—, —$CH_2$—$CH(CH_2CH_3)$—$CH_2$—, —$CH_2$—$C(CH_3)_2$—$CH_2$—, —$CH_2$—$[C(CH_3)_2]_2$—$CH_2$—, —$CH_2$—$[C(OCH_3)_2]_2$—$CH_2$—, —$CH_2$—$[C(OCH_2CH_3)_2]_2$—$CH_2$—, etc.

The preferred acid anhydrides (V) include the aliphatic acid anhydrides, such as malonic anhydride, succinic anhydride, glutaric anhydride, 2-methylglutaric anhydride, 3-methylglutaric anhydride, adipic anhydride, pimelic anhydride, octadecenylsuccinic anhydride, maleic anhydride, itaconic anhydride or citraconic anhydride, the cycloaliphatic acid anhydrides, such as cis- or trans-1,2-cyclohexanedicarboxylic anhydride, and aromatic acid anhydrides, such as phthalic anhydride, 1,2,4-benzenetricarboxylic dianhydride or pyromellitic dianhydride.

In another embodiment, the branched modified polyetheramine having a weight average molecular weight $M_w$ in the range of ≥1,000 g/mol to ≤100,000 g/mol, is obtained by reacting a mixture comprising, a) at least one branched polyetheramine polyol P containing at least one hydroxyl group having a weight average molecular weight $M_w$ in the range of ≥500 g/mol to ≤10,000 g/mol and b) at least one compound B selected from— i) compounds of formula (I)

R-Fg  (I)

wherein R is selected from the group consisting of
linear or branched alkyl having at least 6 carbon atoms, wherein alkyl is selected from $(CH_2$—$C(CH_3)_2)_n$; or $C_nH_{2n+1}$, wherein n is an integer from 6 to 22, wherein alkyl is unsubstituted or substituted by 1 or 2 radicals selected from OH and $C_1$-$C_4$-alkoxy;

linear or branched alkenyl having at least 6 carbon atoms, wherein alkenyl is $C_nH_{2n-1}$, wherein n is an integer from 6 to 22, wherein alkenyl is unsubstituted or substituted by 1 or 2 radicals selected from OH and $C_1$-$C_4$-alkoxy;

a cycloaliphatic radical having at least 5 carbon atoms, wherein the cycloaliphatic radical is unsubstituted or substituted by 1 or 2 radicals selected from OH, $C_1$-$C_4$-alkyl and $C_1$-$C_4$-alkoxy; and aryl and aryl-$C_1$-$C_4$-alkyl, wherein the aryl part is unsubstituted or substituted by 1, 2, 3, 4 or 5 radicals selected from halogen, OH, $NH_2$, $NHC_1$-$C_4$-alkyl, $N(C_1$-$C_4$-alkyl$)_2$, $C_1$-$C_4$-alkyl and $C_1$-$C_4$-alkoxy; and Fg is selected from the group consisting of carboxylic acid, carboxylic acid anhydride, carboxylic acid ester, isocyanate, and mixtures thereof;

(ii) compounds of the formulae (II) and (III)

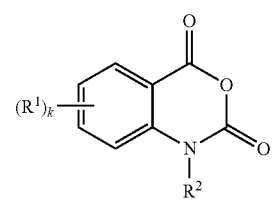

(II)

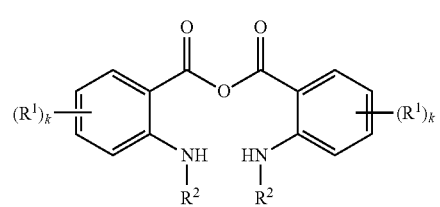

(III)

wherein k is 0, 1, 2, 3 or 4;

$R^1$ is selected from the group consisting of halogen, OH, $NH_2$, $NHC_1$-$C_4$-alkyl, $N(C_1$-$C_4$-alkyl$)_2$, $C_1$-$C_4$-alkyl and $C_1$-$C_4$-alkoxy; and $R^2$ is selected from the group consisting of hydrogen and $C_1$-$C_4$-alkyl;

(iii) lactones of the formula (IV)

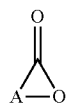

(IV)

wherein A is a $C_3$-$C_{12}$-alkylene, which is unsubstituted or substituted by 1 or 2 radicals selected from OH, $C_1$-$C_4$-alkyl and $C_1$-$C_4$-alkoxy;

iv) internal anhydride of the formula (V)

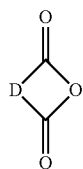

(V)

wherein D is selected from the group consisting of $C_2$-$C_6$ alkylene, $C_2$-alkenylene and 1,2-phenylene, where $C_2$-$C_6$ alkylene and $C_2$ alkenylene are unsubstituted or carry a $C_1$-$C_{18}$ alkyl or $C_1$-$C_{18}$ alkenyl radical and 1,2-phenylene is unsubstituted or substituted by 1 or 2 radicals selected from the group consisting of 1 or 2 radicals selected from OH, $C_1$-$C_4$-alkyl and $C_1$-$C_4$-alkoxy, —COOH or halogen; more preferably a $C_2$-$C_6$-alkylene, which is unsubstituted or substituted by 1 or 2 radicals selected from OH, $C_1$-$C_4$-alkyl and $C_1$-$C_4$-alkoxy.

In this context, the variables R, Fg, $R^1$, k, $R^2$, A and D used in the formulae (I), (II), (III), (IV) and (V) are each as defined as given above.

In another embodiment, the compound B is selected from the group consisting of $C_6$-$C_{22}$-alkenyl succinic anhydrides, $C_6$-$C_{22}$-alkyl succinic anhydrides, polyisobutene succinic anhydrides (PIBSA), $C_6$-$C_{22}$-alkylisocyanates, $C_6$-$C_{22}$-fatty acids, $C_1$-$C_4$-alkyl esters of $C_6$-$C_{22}$-fatty acids, isatoic anhydride, and aliphatic $C_4$-$C_{12}$-lactones In a preferred embodiment, the $C_6$-$C_{22}$-alkenyl succinic anhydrides are, but not limited to, 3-hexylidenetetrahydrofuran-2,5-dione, 3-hen-1-enyltetrahydrofuran-2,5-dione, 3-[henicos-1-enyl]tetrahydrofuran-2,5-dione, 3-[henicosa-1,7-dienyl]tetrahydrofuran-2,5-dione, 3-[henicosa-1,7,18-trienyl]tetrahydrofuran-2,5-dione, 3-[pentadeca-1,7-dienyl]tetrahydrofuran-2,5-dione, 3-[pentadec-4-enyl]tetrahydrofuran-2,5-dione, 3-[dodec-4-enyl]tetrahydrofuran-2,5-dione, 3-[dec-4-enyl]tetrahydrofuran-2,5-dione, 3-[hept-4-enyl]tetrahydrofuran-2,5-dione, 3-[octa-2,4-dienyl]tetrahydrofuran-2,5-dione, 3-[octa-2,4-dienyl]tetrahydrofuran-2,5-dione, 3-[trideca-2,4,10-trienyl]tetrahydrofuran-2,5-dione, 3-[1-hexyltrideca-2,4,10-trienyl]tetrahydrofuran-2,5-dione, 3-[1-hexyltridec-2-enyl]tetrahydrofuran-2,5-dione, 3-trideca-2,5,7,10,12-pentaenyltetrahydrofuran-2,5-dione, 3-dodeca-2,5,7,9,11-pentaenyltetrahydrofuran-2,5-dione, etc.

The representative structural example of the $C_6$-$C_{12}$alkenyl succinic anhydrides are:

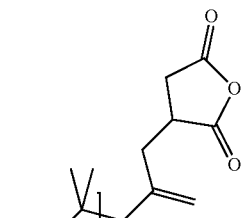

PIBSA

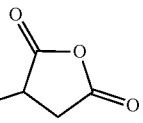

Dodecenyl succinic anhydride wherein n is 1 to 40

In a preferred embodiment, the $C_6$-$C_{22}$ alkyl succinic anhydrides are, but not limited to, 3-docosyltetrahydrofuran-2,5-dione, 3-icosyltetrahydrofuran-2,5-dione, 3-nonadecyltetrahydro-furan-2,5-dione, 3-octadecyltetrahydrofuran-2,5-dione, 3-heptadecyltetrahydrofuran-2,5-dione, 3-hexadecyltetrahydrofuran-2,5-dione, 3-pentadecyltetrahydrofuran-2,5-dione, 3-tetradecyl-tetrahydrofuran-2,5-dione, 3-dodecyltetrahydrofuran-2,5-dione, 3-decyltetrahydrofuran-2,5-dione, 3-octyltetrahydrofuran-2,5-dione, 3-hexyltetrahydrofuran-2,5-dione, 3-(1-propylhexyl)-tetrahydrofuran-2,5-dione, 3-(1-propylpentyl)tetrahydrofuran-2,5-dione, 3-(1-propylbutyl)-tetrahydrofuran-2,5-dione, 3-(1-ethylbutyl)tetrahydrofuran-2,5-dione, 3-(1-methylpentyl)tetra-hydrofuran-2,5-dione, 3-(1-methylhexyl)tetrahydrofuran-2,5-dione, 3-(1-butylhexyl)tetrahydrofuran-2,5-dione, 3-dodecyltetrahydrofuran-2,5-dione, etc.

In a preferred embodiment, the $C_6$-$C_2$-alkylisocyanates are, but not limited to, n-hexyl isocyanate, heptyl isocyanate, n-octyl isocyanate, n-decyl isocyanate, cyclohexyl isocyanate, hexamethylene diisocyanate, dodecyl isocyanate, tetradecyl isocyanate, tridecyl isocyanate, pentadecyl isocyanate, 5-isocyanatoundecane, 5-isocyanatononane, 5-isocyanatooctadecane, 8-isocyanatohenicosane, 10-isocyanatohenicosane, 10-isocyanatononadecane, 8-isocyanatoheptadecane, 8-isocyanatopentadecane, 7-isocyanatotetradecane, 7-isocyanatotridecane, 6-isocyanatododecane, 5-isocyanatoundecane, 5-isocyanatodecane, 4-isocyanatononane, etc.

In a preferred embodiment, the compound B are $C_6$-$C_{22}$-fatty acids. The $C_6$-$C_{22}$ fatty acids can be a saturated or an unsaturated fatty acid with one or more double bond. The representative examples of the saturated and unsaturated fatty acids are, but not limited to, caproic acid, enanthic acid, caprylic acid, pelargonic acid, capric acid, undecylic acid, lauric acid, tridecylic acid, myristic acid, pentadecylic acid, palmitic acid, margaric acid, nonadecylic acid, arachidic acid, heneicosylic acid, behenic acid, tricosylic acid, α-linolenic acid, myristoleic acid, palmitoleic acid, sapienic acid, oleic acid, elaidic acid, vaccenic acid, gadoleic, eicosenoic acid, erucic acid, linoleic acid, eicosadienoic acid, docosadienoic acid, α-linolenic acid, γ-linolenic acid, pinolenic acid, eleostearic acid, β-eleostearic acid, mead acid, dihomo-γ-linolenic acid, eicosatrienoic acid, stearidonic acid, arachidonic acid, eicosatetraenoic acid, adrenic acid, bosseopentaenoic acid, eicosapentaenoic acid, ozubondo acid, sardine acid, tetracosanolpentaenoic acid, docosahexaenoic acid, herring acid, etc.

In a preferred embodiment, the compound B are $C_1$-$C_4$-alkyl esters of $C_6$-$C_{22}$-fatty acids. The representative examples of the $C_1$-$C_4$-alkyl esters of $C_6$-$C_{22}$-fatty acids are, but not limited to, methyl decanoate, ethyl decanoate, propyl decanoate, isopropyl decanoate, butyl decanoate, isopropyl palmitate, methyl palmitate, ethyl palmitate, methyl oleate, isopropyl oleate, methyl arachidonate, ethyl gadolenate, isoproyl gadolenate, methyl sapienate, isoproyl sapienate, methyl linoleniate, isoproyl linoleniate, butyl linoleniate, isobutyl linoleniate, etc.

In another preferred embodiment, the compound B is isatonic anhydride.

Isatonic anhydride

In another preferred embodiment, the compound B is an aliphatic $C_4$-$C_{12}$-lactone. The representative example of the $C_4$-$C_{12}$-lactones are, but not limited to, tetrahydropyran-2-one, tetrahydrofuran-2-one, oxepan-2-one, oxocan-2-one, oxonan-2-one, oxecan-2-one, oxacycloundecan-2-one, oxacyclododecan-2-one, 3-oxabicyclo[8.2.1]tridecan-4-one, 4-oxabicyclo[7.3.1]tridecan-3-one, 10-oxabicyclo[6.4.1]tridecan-11-one, 4,5,5a,6,7,8,9,9a-octahydro-1H-benzo[c]oxepin-3-one, 3,4,4a,5,6,7,8,8a-octahydrochromen-2-one, etc.

In a preferred embodiment, the at least one compound B reacts with the at least one hydroxyl group of the at least one branched polyetheramine polyol P, to form at least one linking group selected from the group consisting of an ester, an urethane and an amide. The at least one hydroxyl group of the at least one branched polyetheramine polyol when reacts with the at least one carboxylic acid group of the at least one compound B can lead to the formation of the ester linkage. The at least one hydroxyl group of the at least one branched polyetheramine polyol when reacts with the at least one carboxylic acid anhydride group of the at least one compound B can lead to the formation of the ester linkage. The at least one hydroxyl group of the at least one branched polyetheramine polyol when reacts with the at least one lactone group of the at least one compound B can lead to the formation of the ester linkage. The at least one hydroxyl group of the at least one branched polyetheramine polyol when reacts with the at least one isocyanate group of the at least one compound B can lead to the formation of the urethane linkage. The reaction product of the at least one branched polyetheramine polyol P with the at least one compound B can have a mixture of linkages, when more than one compound of B is used. For example, when the at least two hydroxyl group of the at least one branched polyetheramine polyol reacts with the compounds of the formulae (II) or (III) and the compound of formula (I), the resulting product will have a mixture of the ester and the amide linkages. In another example, when the at least two hydroxyl group of the at least one branched polyetheramine polyol reacts with the compound of formula (I) bearing a carboxylic acid and the compound of formula (V) bearing an anhydride, a mixture of ester linkages is obtained. In yet another example, when the at least two hydroxyl group of the at least one branched polyetheramine polyol react with the compound of formula (I) bearing an isocyanate group and the compound of formula (V) bearing a cyclic anhydride group, mixtures of the ester and the urethane linkages are obtained. In a further example, when the at least two hydroxyl groups of the at least one branched polyetheramine polyol react with the compound of formula (I) bearing an isocyanate group and the compound of formula (II) and/or (III), mixtures of the ester, the amide and the urethane linkages are obtained.

In an embodiment, the at least 5 mol % of the hydroxyl groups of the at least one branched polyetheramine polyol P are reacted with the at least one compound B, more preferably the at least 10 mol % of the hydroxyl groups of the at least one branched polyetheramine polyol P are reacted with the at least one compound B, most preferably the at least 15 mol % of the hydroxyl groups of the at least one branched polyetheramine polyol P are reacted with the at least one compound B and particular preferably the at least 25 mol % of the hydroxyl groups of the at least one branched polyetheramine polyol P are reacted with the at least one compound B.

In an embodiment, the molar ratio of the functional groups Fg in the at least one compound of general formula (I) to the hydroxyl groups in the at least one branched polyetheramine polyol P is in the range of $\geq 0.1:1$ to $\leq 1:1$; or the molar ratio of the groups in the at least one compound of general formula (II) and/or (III) to the hydroxyl groups in the at least one branched polyetheramine polyol P is in the range of $\geq 0.1:1$ to $\leq 1:1$;

or the molar ratio of the groups in the at least one compound of general formula (IV) to the hydroxyl groups in the at least one branched polyetheramine polyol P is in the range of $\geq 1:1$ to $\leq 10:1$ or the molar ratio of the lactone groups in the at least one compound of general formula (V) to the hydroxyl groups in the at least one branched polyetheramine polyol P is in the range from $\geq 0.05:1$ to $\leq 2:1$.

More preferably, the molar ratio of the functional groups Fg in the at least one compound of general formula (I) to the hydroxyl groups in the at least one branched polyetheramine polyol P is in the range of $\geq 0.3:1$ to $\leq 1:1$;

or the molar ratio of the groups in the at least one compound of general formula (II) and/or (III) to the hydroxyl groups in the at least one branched polyetheramine polyol P is in the range of $\geq 0.3:1$ to $\leq 1:1$;

or the molar ratio of the groups in the at least one compound of general formula (IV) to the hydroxyl groups in the at least one branched polyetheramine polyol P is in the range of $\geq 1:1$ to $\leq 5:1$;

or the molar ratio of the lactone groups in the at least one compound of general formula (V) to the hydroxyl groups in the at least one branched polyetheramine polyol P is in the range from $\geq 0.1:1$ to $\leq 2:1$.

Most preferably, the molar ratio of the functional groups Fg in the at least one compound of general formula (I) to the hydroxyl groups in the at least one branched polyetheramine polyol P is in the range of $\geq 0.5:1$ to $\leq 1:1$; or the molar ratio of the groups in the at least one compound of general formula (II) and/or (III) to the hydroxyl groups in the at least one branched polyetheramine polyol P is in the range of $\geq 0.5:1$ to $\leq 1:1$;

or the molar ratio of the groups in the at least one compound of general formula (IV) to the hydroxyl groups in the at least one branched polyetheramine polyol P is in the range of ≥1:1 to ≤3:1;

or the molar ratio of the lactone groups in the at least one compound of general formula (V) to the hydroxyl groups in the at least one branched polyetheramine polyol P is in the range from ≥0.3:1 to ≤2:1.

Preferably, the molar ratio of the functional groups Fg in the at least one compound of general formula (I) to the hydroxyl groups in the at least one branched polyetheramine polyol P is in the range of ≥0.8:1 to ≤1:1;

or the molar ratio of the groups in the at least one compound of general formula (II) and/or (III) to the hydroxyl groups in the at least one branched polyetheramine polyol P is in the range of ≥0.8:1 to ≤1:1;

or the molar ratio of the groups in the at least one compound of general formula (IV) to the hydroxyl groups in the at least one branched polyetheramine polyol P is in the range of ≥1:1 to ≤2:1;

or the molar ratio of the lactone groups in the at least one compound of general formula (V) to the hydroxyl groups in the at least one branched polyetheramine polyol P is in the range from ≥0.5:1 to ≤2:1.

In an embodiment, the weight ratio of the at least one compound B to the at least one branched polyetheramine polyol P is in the range from ≥1:3 to ≤3:1, more preferably the weight ratio of the at least one compound B to the at least one branched polyetheramine polyol P is in the range from ≥1:2.5 to ≤2.5:1, most preferably the weight ratio of the at least one compound B to the at least one branched polyetheramine polyol P is in the range from ≥1:2 to ≤2:1, particular preferably the weight ratio of the at least one compound B to the at least one branched polyetheramine polyol P is in the range from ≥1:1.5 to ≤1.5:1.

In another embodiment, the branched modified polyetheramine having a weight average molecular weight $M_w$ in the range of ≥1000 g/mol to ≤100,000 g/mol is obtained by reacting a mixture comprising:

a) at least one modified branched polyetheramine; and
b) at least one compound B selected from
i) compounds of formula (I)

wherein R is selected from the group consisting of
  linear or branched alkyl having at least 6 carbon atoms, wherein alkyl is unsubstituted or substituted by 1 or 2 radicals selected from OH and $C_1$-$C_4$-alkoxy;
  linear or branched alkenyl having at least 6 carbon atoms, wherein alkenyl is unsubstituted or substituted by 1 or 2 radicals selected from OH and $C_1$-$C_4$-alkoxy;
  a cycloaliphatic radical having at least 5 carbon atoms, wherein the cycloaliphatic radical is unsubstituted or substituted by 1 or 2 radicals selected from OH, $C_1$-$C_4$-alkyl and $C_1$-$C_4$-alkoxy; and
  aryl and aryl-$C_1$-$C_4$-alkyl, wherein the aryl part is unsubstituted or substituted by 1, 2, 3, 4 or 5 radicals selected from halogen, OH, $NH_2$, $NHC_1$-$C_4$-alkyl, $N(C_1$-$C_4$-alkyl$)_2$, $C_1$-$C_4$-alkyl and $C_1$-$C_4$-alkoxy; and Fg is selected from the group consisting of carboxylic acid, hydroxy carboxylic acid, carboxylic acid anhydride, carboxylic acid ester, isocyanate, and mixtures thereof;

(ii) compounds of the formulae (II) and (III)

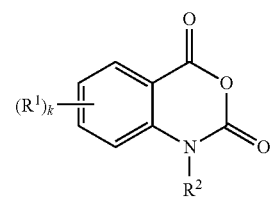

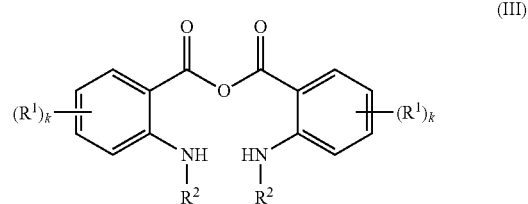

wherein
k is 0, 1, 2, 3 or 4;
$R^1$ is selected from the group consisting of halogen, OH, $NH_2$, $NHC_1$-$C_4$-alkyl, $N(C_1$-$C_4$-alkyl$)_2$, $C_1$-$C_4$-alkyl and $C_1$-$C_4$-alkoxy; and
$R^2$ is selected from the group consisting of hydrogen and $C_1$-$C_4$-alkyl;

(iii) lactones of the formula (IV)

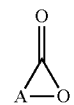

wherein A is a $C_3$-$C_{12}$-alkylene, which is unsubstituted or substituted by 1 or 2 radicals selected from OH, $C_1$-$C_4$-alkyl and $C_1$-$C_4$-alkoxy;

iv) internal anhydride of the formula (V)

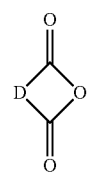

wherein D is selected from the group consisting of $C_2$-$C_6$ alkylene, $C_2$-alkenylene and 1,2-phenylene, where $C_2$-$C_6$ alkylene and $C_2$ alkenylene are unsubstituted or carry a $C_1$-$C_{18}$ alkyl or $C_1$-$C_{18}$ alkenyl radical and 1,2-phenylene is unsubstituted or substituted by 1 or 2 radicals selected from the group consisting of 1 or 2 radicals selected from OH, $C_1$-$C_4$-alkyl and $C_1$-$C_4$-alkoxy, —COOH or halogen.

In this context, the variables R, Fg, $R^1$, $R^2$, A, D and k used in the formulae (I), (II), (III), (IV) and (V) are each as defined as given above.

In a preferred embodiment, the reaction is carried out at a temperature is in the range of ≥60 to ≤300° C., more preferably the temperature is in the range of ≥60 to 250° C.≤, most preferably the temperature is in the range of ≥70 to 200° C.≤ and particular preferably the temperature is in the range of ≥90 to 180° C.≤.

In a preferred embodiment, the product of the reaction is isolated by any method known in the art selected from the group consisting of decantation, chemical separation, acid-base neutralization, distillation, evaporation, column chromatography, filtration, concentration, crystallization and re-crystallization or a combination thereof. A person skilled in the art is aware of such techniques.

In a preferred embodiment, the at least one branched polyetheramine polyol P has an amine number determined according to ISO 25761 is in the range from ≥200 to ≤1000 mg KOH/g, more preferably is in the range from ≥200 to ≤800 mg KOH/g, even more preferably is in the range from ≥250 to ≤700 mg KOH/g, most preferably is in the range from ≥350 to ≤650 mg KOH/g, particular preferably is in the range from ≥400 to ≤600 mg KOH/g.

In a preferred embodiment, the at least one branched modified polyetheramine has an amine number determined according to DIN 53176 is in the range from ≥20 to ≤600 mg KOH/g, more preferably is in the range from ≥20 to ≤400 mg KOH/g, even more preferably is in the range from ≥25 to ≤300 mg KOH/g, most preferably is in the range from ≥30 to ≤280 mg KOH/g, particular preferably is in the range from ≥30 to ≤250 mg KOH/g.

In a preferred embodiment, the modified branched polyetheramine polyols (B) have a glass transition temperature of ≤50° C., more preferably ≤30° C., and even more preferably ≤10° C., determined by differential scanning calorimetry (DSC).

In an embodiment, the branched modified polyetheramine is neutralized with at least one polymeric carboxylic acid or at least one polymeric phosphoric acid.

In a preferred embodiment, the at least one polymeric carboxylic acid (V) has general formula (VA) or (VB)

formula (VA)

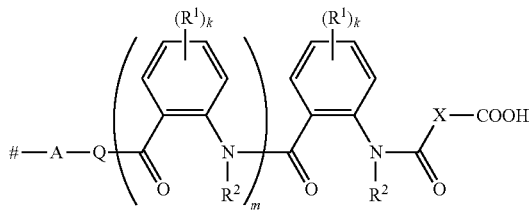

wherein
# indicates the point of attachment to the terminus and/or to the polymer backbone;
k is 0, 1, 2, 3 or 4, in particular 0, 1 or 2, especially 0 or 1;
m is 0, 1, 2, 3, 4, 5, 6, 7, 8 or 9, in particular 0, 1 or 2, especially 0 or 1;
A is a chemical bond or a divalent moiety selected from the group consisting of $C_1$-$C_6$ alkylene, —O—($C_2$-$C_6$ alkylene), —C(=O)—O—($C_2$-$C_6$ alkylene), —$NR^3$—($C_2$-$C_6$ alkylene) and C(=O)—$NR^3$—($C_2$-$C_6$ alkylene), where the $C_2$-$C_6$ alkylene part is attached to Q;
Q is a divalent moiety selected from the group consisting of —O—, —NH— and —S—; more preferably —O— and —NH—, most preferably —O—;
$R^1$ is independently selected from the group consisting of —OH, —COOH, —COOCH$_3$, —NH$_2$, —NH($C_1$-$C_6$ alkyl), —N($C_1$-$C_6$ alkyl)$_2$, —NO$_2$, —S(=O)$_2$R$^4$, $C_1$-$C_{20}$ alkyl, $C_1$-$C_4$ alkoxy, halogen, aryloxy, aryl, heteroaryl, where aryl, hetaryl and aryloxy are unsubstituted or substituted by 1, 2, 3 or 4 radicals selected from the group consisting of —OH, —COOH, —COOCH$_3$, —NH$_2$, —NH($C_1$-$C_6$ alkyl), —N($C_1$-$C_6$ alkyl)$_2$, —NO$_2$, —S(=O)$_2$R$^4$, $C_1$-$C_4$ alkyl, $C_1$-$C_4$ alkoxy and halogen;
$R^2$ is selected from the group consisting of hydrogen, —S(=O)$_2$R$^4$, $C_1$-$C_{20}$ alkyl, $C_3$-$C_{10}$ cycloalkyl, aryl, heteroaryl, aryl-$C_1$-$C_4$-alkyl and heteroaryl-$C_1$-$C_4$-alkyl, where aryl and hetaryl in the four last mentioned radicals are unsubstituted or substituted by 1, 2, 3 or 4 radicals selected from the group consisting of —OH, —COOH, —COOCH$_3$, —NH$_2$, —NH($C_1$-$C_6$ alkyl), —N($C_1$-$C_6$ alkyl)$_2$, —NO$_2$, —S(=O)$_2$R$^4$, $C_1$-$C_4$ alkyl, $C_1$-$C_4$ alkoxy and halogen;
X is a divalent moiety selected from the group consisting of $C_1$-$C_{10}$ alkylene, $C_2$-$C_6$ alkenylene, $C_4$-$C_7$ cycloalkylene, arylene and alkarylene, where the $C_1$-$C_{10}$ alkylene, $C_2$-$C_6$ alkenylene and $C_4$-$C_7$ cycloalkylene are unsubstituted or substituted by 1, 2, 3 or 4 radicals selected from the group consisting of $C_1$-$C_{18}$ alkyl or $C_1$-$C_{18}$ alkenyl, and where arylene and alkarylene are unsubstituted or substituted by 1, 2, 3 or 4 radicals selected from the group consisting of $C_1$-$C_4$ alkyl, $C_1$-$C_4$ haloalkyl, aryl, —COOH, —COOCH$_3$, —NO$_2$ or halogen;
$R^3$ is selected from the group consisting of hydrogen, —S(=O)$_2$R$^4$, $C_1$-$C_{20}$ alkyl, $C_3$-$C_{10}$ cycloalkyl, aryl and heteroaryl, where aryl and hetaryl are unsubstituted or substituted by 1, 2, 3 or 4 radicals selected from the group consisting of —OH, —COOH, —COOCH$_3$, —NH$_2$, —NH($C_1$-$C_6$ alkyl), —N($C_1$-$C_6$ alkyl)$_2$, —NO$_2$, —S(=O)$_2$R$^4$, $C_1$-$C_4$ alkyl, $C_1$-$C_4$ alkoxy and halogen;
$R^4$ is selected from the group consisting of OH, —NH$_2$, —NH($C_1$-$C_6$ alkyl), —N($C_1$-$C_6$ alkyl)$_2$, $C_1$-$C_4$ alkyl, $C_1$-$C_4$ alkoxy, aryl and heteroaryl, where aryl and hetaryl are unsubstituted or substituted by 1, 2, 3 or 4 radicals selected from the group consisting of $C_1$-$C_4$ alkyl, $C_1$-$C_4$ alkoxy and halogen.

Further examples and the means of preparation of the such polymeric carboxylic acid having general formula (VA) can be found in WO2013/124830, which is herein incorporated for the reference for the polymeric carboxylic acid.

In a preferred embodiment, the at least one polymeric carboxylic acid has general formula (VB)

Formula (VB)

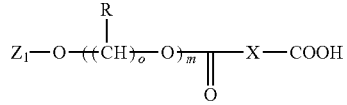

$Z_1$ is selected from the group consisting of substituted or unsubstituted linear or branched saturated or unsaturated $C_1$ to $C_{30}$ hydrocarbyl and substituted or unsubstituted saturated or unsaturated cyclohydrocarbyl;

R is H or substituted or unsubstituted $C_1$ to $C_6$ alkyl;

X is selected from the group consisting of substituted or unsubstituted $C_1$ to $C_{10}$ alkylene and substituted or unsubstituted $C_1$ to $C_{10}$ cycloalkylene;

is 1 to 6; and m is 1 to 50.

Preferably, $Z_1$ is selected from the group consisting of substituted or unsubstituted linear or branched saturated or unsaturated $C_1$ to $C_{30}$ hydrocarbyl, and substituted or unsubstituted saturated or unsaturated cyclohydrocarbyl;

R is H or substituted or unsubstituted $C_1$ to $C_6$ alkyl;

X is selected from the group consisting of substituted or unsubstituted $C_1$ to $C_{10}$ alkylene and substituted or unsubstituted $C_1$ to $C_{10}$ cycloalkylene;

is 1 to 6; and m is 1 to 50.

More preferably, $Z_1$ is selected from the group consisting of substituted or unsubstituted linear or branched saturated or unsaturated $C_1$ to $C_{30}$ hydrocarbyl;

R is H or substituted or unsubstituted $C_1$ to $C_6$ alkyl;

X is selected from the group consisting of substituted or unsubstituted $C_1$ to $C_{10}$ alkylene;

is 1 to 6; and m is 1 to 50.

Most preferably, $Z_1$ is selected from the group consisting of substituted or unsubstituted linear or branched saturated or unsaturated $C_6$ to $C_{30}$ hydrocarbyl;

R is H or substituted or unsubstituted $C_1$ to $C_6$ alkyl;

X is selected from the group consisting of substituted or unsubstituted $C_1$ to $C_{10}$ alkylene;

o is 1 to 6; and m is 1 to 50.

Yet most preferably $Z_1$ is selected from the group consisting of unsubstituted linear or branched saturated or unsaturated $C_6$ to $C_{30}$ hydrocarbyl;

R is H or unsubstituted $C_2$ to $C_4$ alkyl;

X is selected from the group consisting of unsubstituted $C_4$ to $C_{10}$ alkylene;

is 2 to 6; and m is 6 to 50.

Particular preferably, $Z_1$ is selected from the group consisting of unsubstituted linear saturated or unsaturated $C_8$ to $C_{30}$ hydrocarbyl;

R is H;

X is selected from the group consisting of unsubstituted $C_4$ to $C_{10}$ alkylene;

o is 2 to 6; and m is 10 to 24.

The term hydrocarbyl denotes a hydrocarbon chain containing hydrogen and carbon. The hydrocarbyl is optionally containing at least one double bond and/or at least one triple bond.

The representative examples of the saturated hydrocarbyl are, but not limited to, isopropyl, iso-butyl, neo-pentyl, 2-ethyl-hexyl, 2-propyl-heptyl, 2-butyl-octyl, 2-pentyl-nonyl, 2-hexyl-decyl, iso-hexyl, iso-heptyl, iso-octyl, iso-nonyl, iso-decyl, iso-dodecyl, iso-tetradecyl, iso-hexadecyl, iso-octadecyl and iso-eicosyl.

The representative examples of the unsaturated hydrocarbyl having at least one double bond are, but not limited to, 1-propenyl, 1-butenyl, 1-pentenyl, 1-hexenyl, 2-hexenyl, 1-heptenyl, 2-heptenyl, 1-octenyl, 2-octenyl, 1-nonenyl, 2-nonenyl, 1-decenyl, 2-decenyl, 1-undecenyl, 2-undecenyl, 1-dodecenyl, 2-dodecenyl, 1-tridecenyl, 2-tridecenyl, 1-tetradecenyl, 2-tetradecenyl, 1-pentadecenyl, 2-pentadecenyl, 1-hexadecenyl, 2-hexadecenyl, 1-heptadecenyl, 2-heptadecenyl, 1-octadecenyl, 2-octadecenyl, 1-nonadecenyl, 2-nonadecenyl, 1-eicosenyl and 2-eicosenyl, more preferably selected from 1-hexenyl, 2-hexenyl, 1-heptenyl, 2-heptenyl, 1-octenyl, 2-octenyl, 1-nonenyl, 2-nonenyl, 1-decenyl, 2-decenyl, 1-undecenyl, 2-undecenyl, 1-dodecenyl, 2-dodecenyl, 1-tridecenyl, 2-tridecenyl, 1-tetradecenyl, 2-tetradecenyl, 1-pentadecenyl, 2-pentadecenyl, 1-hexadecenyl, 2-hexadecenyl, 1-heptadecenyl, 2-heptadecenyl, 1-octadecenyl, 2-octadecenyl, 1-nonadecenyl, 2-nonadecenyl, 1-eicosenyl and 2-eicosenyl.

The term substituted or unsubstituted saturated or unsaturated cyclohydrocarbyl denotes a cyclic hydrocarbon containing the hydrogen and the carbon. The cyclohydrocarbyl can be monocyclic and bicyclic. The representative examples of the unsubstituted or the branched $C_3$-$C_{10}$ monocyclic and bicyclic cycloalkyl include, but are not limited to, cyclopropyl, cyclobutyl, cyclopentyl, cyclohexyl, cycloheptyl, bicyclo[2.2.1]heptyl and bicyclo[3.1.1]heptyl.

In a preferred embodiment, the at least one polymeric phosphoric acid has the general formula (VI). The compound of general formula (VI) may be a monoester or a mixture of mono- or diester.

formula (VI)

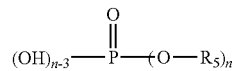

wherein $R_5$ represents an aliphatic, a cycloaliphatic and/or an aromatic moiety free of any Zerewitinoff hydrogen, containing at least one ether oxygen atom (—O—) and/or at least one carboxylic acid ester group (—COO—) or urethane group (—NHC(O)O—), and having a number average molecular weight $M_n$ of 200 to 10,000 g/mol, in which the aliphatic hydrogen atoms may be partially replaced by halogen atoms, and in which the ratio of the number of the ether oxygen atoms to the number of the carboxylic acid ester groups or the urethane groups in each group $R_5$ is in the range from 1:20 to 20:1, and n represents 1 or 2, or a salt thereof.

Preferably, $R_5$ represents an aliphatic, a cycloaliphatic and/or an aromatic moiety free of any Zerewitinoff hydrogen, containing at least one ether oxygen atom (—O—) and at least one carboxylic acid ester group (—COO—) or urethane group (—NHC(O)O—), and having a number average molecular weight $M_n$ of 200 to 10,000 g/mol, in which the aliphatic hydrogen atoms may be partially replaced by halogen atoms, and in which the ratio of the number of the ether oxygen atoms to the number of the carboxylic acid ester groups or the urethane groups in each group $R_5$ is in the range from 1:20 to 20:1, and n represents 1 or 2, or a salt thereof.

More preferably, $R_5$ represents the residue of an oxalkylated monoalcohol optionally containing carboxylic acid ester groups and/or urethane groups. $R_5$ particularly preferably represents the residue of a $C_1$-$C_6$ alkylene oxide optionally containing carboxylic acid ester groups and/or urethane groups. $R_5$ most preferably represents the residue of an ethoxylated monoalcohol containing carboxylic acid ester groups and/or urethane groups.

Most preferably, $R_5$ represents the residue of an oxalkylated monoalcohol containing carboxylic acid ester groups and/or urethane groups. $R_5$ particularly preferably represents the residue of a $C_1$-$C_4$ oxalkylated monoalcohol optionally containing carboxylic acid ester groups and/or urethane groups. $R_5$ most preferably represents the residue of an ethoxylated monoalcohol containing carboxylic acid ester groups and/or urethane groups.

In another preferred embodiment, in case the value of n is 2, then $R_5$ is the same or different.

In a preferred embodiment, the ratio of the number of alkylene oxide oxygen atoms to the number of the carboxylic acid ester groups and/or the urethane groups in $R_5$ is in the range from 1:20 to 20:1, more preferably this ratio is in the range from 1:10 to 10:1, and particularly preferably the range is from 1:5 to 5:1.

In a preferred embodiment, the polymeric phosphoric acid of general formula (VI) has number average molecular weight $M_n$ in the range of 100 to 10,000 g/mol, more preferably from 200 to 5,000 g/mol, and particularly preferably from 300 to 2,000 g/mol.

In a preferred embodiment, the monohydroxy compounds which contain at least one alkylene oxide oxygen atom (—O—) and at least one carboxylic acid ester group (—C(O)O—) and/or urethane group (—NHC(O)O—) are mixed with the polyether-polyesters, the polyether-polyurethanes or the polyether-polyester-polyurethanes. The examples of the polyether-polyester compounds include, but are not limited, to those obtained by polymerizing a lactone such as propiolactone, valerolactone or caprolactone, substituted derivatives thereof, or mixtures thereof with the monohydroxy compounds. The monohydroxy compounds preferably having 1 to 30 carbon atoms, more preferably 1 to 14 carbon atoms, are methanol, ethanol, propanol, n-butanol, longer-chained saturated and unsaturated alcohols such as oxo alcohols, cyclohexanol, phenylethanol, neopentyl alcohol, and also fluorinated alcohols and substituted and unsubstituted phenols can be used as starting materials for the alkoxylation.

Processes for preparation of the polymeric phosphoric acid of general formula (VI) can be found in U.S. Pat. No. 5,130,463, which is herein incorporated by reference for the polymeric phosphoric acid.

In an embodiment, the at least one polymeric carboxylic acid or the at least one polymeric phosphoric acid comprises a poly-$C_2$-$C_6$-alkyleneoxide radical.

In a preferred embodiment, the at least one polymeric carboxylic acid of formula (VA) is a compound of formula (VA1)

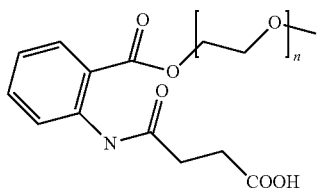

formula (VA1)

wherein n is 5 to 50.

In a preferred embodiment, the polyisobutylene succinic anhydride reacts with the at least one hydroxyl group of the at least one branched polyetheramine polyol P to form a branched polyetheramine modified with the polyisobutylene succinic anhydride having a weight average molecular weight $M_w$ in the range of ≥1000 g/mol to ≤100000 g/mol, which is further neutralized with the carboxylic acid of formula (VA1).

In a preferred embodiment, the dodecenyl succinic anhydride reacts with the at least one hydroxyl group of the at least one branched polyetheramine polyol P to form a branched polyetheramine modified with the dodecenyl succinic anhydride having a weight average molecular weight $M_w$ in the range of ≥1000 g/mol to ≤100000 g/mol, which is further neutralized with the carboxylic acid of formula (VA1).

In a preferred embodiment, the octadecyl isocyanate reacts with the at least one hydroxyl group of the at least one branched polyetheramine polyol P to form a branched polyetheramine modified with the octadecyl isocyanate having a weight average molecular weight $M_w$ in the range of ≥1000 g/mol to ≤100000 g/mol, which is further neutralized with the carboxylic acid of formula (VA1).

In a preferred embodiment, the lauric acid reacts with the at least one hydroxyl group of the at least one branched polyetheramine polyol P to form a branched polyetheramine modified with the lauric acid having a weight average molecular weight $M_w$ in the range of ≥1000 g/mol to ≤100000 g/mol, which is further neutralized with the carboxylic acid of formula (VA1).

In a preferred embodiment, the tall oil fatty acid reacts with the at least one hydroxyl group of the at least one branched polyetheramine polyol P to form a branched polyetheramine modified with the tall oil fatty acid having a weight average molecular weight $M_w$ in the range of ≥1000 g/mol to ≤100000 g/mol, which is further neutralized with the carboxylic acid of formula (VA1).

In a preferred embodiment, the epsilon-caprolactone reacts with the at least one hydroxyl group of the at least one branched polyetheramine polyol P to form a branched polyetheramine modified with the epsilon-caprolactone having a weight average molecular weight $M_w$ in the range of ≥1000 g/mol to ≤100000 g/mol, which is further neutralized with the carboxylic acid of formula (VA1).

In a preferred embodiment, the valerolactone reacts with the at least one hydroxyl group of the at least one branched polyetheramine polyol P to form a branched polyetheramine modified with the valerolactone having a weight average molecular weight $M_w$ in the range of ≥1000 g/mol to ≤100000 g/mol, which is further neutralized with the carboxylic acid of formula (VA1).

In a preferred embodiment, the gamma-valerolactone reacts with the at least one hydroxyl group of the at least one branched polyetheramine polyol P to form a branched polyetheramine modified with the gamma-valerolactone having a weight average molecular weight $M_w$ in the range of ≥1000 g/mol to ≤100000 g/mol, which is further neutralized with the carboxylic acid of formula (VA1).

In a preferred embodiment, the epsilon-caprolactone and the gamma-valerolactone reacts with the at least two hydroxyl groups of the at least one branched polyetheramine polyol P to form a branched polyetheramine modified with the epsilon-caprolactone and the gamma-valerolactone having a weight average molecular weight $M_w$ in the range of ≥1000 g/mol to ≤100000 g/mol, which is further neutralized with the carboxylic acid of formula (VA1).

In a preferred embodiment, the epsilon-caprolactone, the gamma-valerolactone and the lauric acid react with the at least three hydroxyl groups of the at least one branched polyetheramine polyol P to form a branched polyetheramine modified with the epsilon-caprolactone, the gamma-valerolactone and the lauric acid having a weight average molecular weight $M_w$ in the range of ≥1000 g/mol to ≤100000 g/mol, which is further neutralized with the carboxylic acid of formula (VA1).

In a preferred embodiment, the isatoic anhydride reacts with the at least one hydroxyl group of the at least one branched polyetheramine polyol P to form a branched polyetheramine modified with the isatoic anhydride having a weight average molecular weight $M_w$ in the range of ≥1000 g/mol to ≤100000 g/mol, which is further neutralized with the carboxylic acid of formula (VA1).

In a preferred embodiment, the isatoic anhydride, the epsilon-caprolactone and the gamma-valerolactone react with the at least three hydroxyl groups of the at least one branched polyetheramine polyol P to form a branched polyetheramine modified with the isatoic anhydride, the epsilon-caprolactone and the gamma-valerolactone having a weight average molecular weight $M_w$ in the range of ≥1000 g/mol to ≤100000 g/mol, which is further neutralized with the carboxylic acid of formula (VA1).

In a preferred embodiment, the isatoic anhydride and the tall oil fatty acid react with the at least two hydroxyl groups of the at least one branched polyetheramine polyol P to form a branched polyetheramine modified with the isatoic anhydride and the tall oil fatty acid having a weight average molecular weight $M_w$ in the range of ≥1000 g/mol to ≤100000 g/mol, which is further neutralized with the carboxylic acid of formula (VA1).

In a preferred embodiment, the tall oil fatty acid and the succinic anhydride react with the at least two hydroxyl groups of the at least one branched polyetheramine polyol P to form a branched polyetheramine modified with the tall oil fatty acid and the succinic anhydride having a weight average molecular weight $M_w$ in the range of ≥1000 g/mol to ≤100000 g/mol, which is further neutralized with the carboxylic acid of formula (VA1).

In a preferred embodiment, the tall oil fatty acid and the isatoic anhydride react with the at least two hydroxyl groups of the at least one branched polyetheramine polyol P to form a branched polyetheramine modified with the tall oil fatty acid and the isatoic anhydride having a weight average molecular weight $M_w$ in the range of ≥1000 g/mol to ≤100000 g/mol, which is further neutralized with the carboxylic acid of formula (VA1).

In a preferred embodiment, the tall oil fatty acid, the epsilon-caprolactone and the gamma-valerolactone react with the at least three hydroxyl groups of the at least one branched polyetheramine polyol P to form a branched polyetheramine modified with the tall oil fatty acid, the epsilon-caprolactone and the gamma-valerolactone having a weight average molecular weight $M_w$ in the range of ≥1000 g/mol to ≤100000 g/mol, which is further neutralized with the carboxylic acid of formula (VA1).

In a preferred embodiment, the at least one polymeric carboxylic acid of general formula (VB) is a compound of formula (VB1).

formula (VB1)

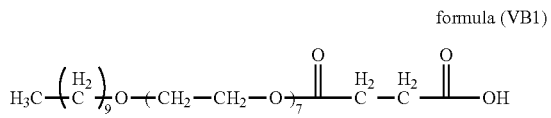

In a preferred embodiment, the polyisobutylene succinic anhydride reacts with the at least one hydroxyl group of the at least one branched polyetheramine polyol P to form a branched polyetheramine modified with the polyisobutylene succinic anhydride having a weight average molecular weight $M_w$ in the range of ≥1000 g/mol to ≤100000 g/mol, which is further neutralized with the carboxylic acid of formula (VB1).

In a preferred embodiment, the at least one polymeric phosphoric acid of general formula (VI) is a compound of formula (VIa). The compound of formula (VIa) may be a monoester or a mixture of mono- or diesters.

formula (VIa)

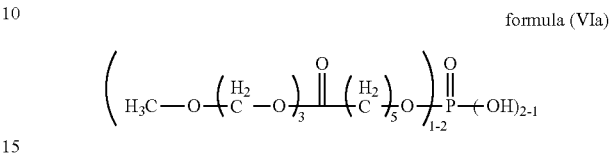

In an embodiment, a liquid composition is in the form of a dispersion comprising a branched modified polyetheramine and a particulate solid material selected from the group consisting of pigments and fillers and a liquid diluent, wherein the particulate solid material is dispersed in the liquid diluent. The branched modified polyetheramine is as defined as above. The pigments are selected from the organic or the inorganic pigments.

In an embodiment, a liquid composition is in the form of a dispersion comprising a branched modified polyetheramine which is further modified with at least one component B and a particulate solid material selected from the group consisting of pigments and fillers and a liquid diluent, wherein the particulate solid material is dispersed in the liquid diluent. The branched modified polyetheramine which is further modified with at least one component B is as defined as above. The pigments are selected from the organic or the inorganic pigments.

In an embodiment, a liquid composition is in the form of a dispersion comprising a branched modified polyetheramine which is further modified with at least one component B and a particulate solid material selected from the group consisting of pigments and fillers and a liquid diluent, wherein the particulate solid material is dispersed in the liquid diluent. The branched modified polyetheramine or the branched modified polyetheramine which is further modified with at least one component B which is neutralised with an acid of formula (V) or (VI) is as defined as above. The pigments are selected from the organic or the inorganic pigments.

In a preferred embodiment, the invention relates in particular to a liquid composition in the form of a liquid coating composition, which comprises a particulate solid material, in particular a pigment or a filler and a branched modified polyetheramine and/or a branched modified polyetheramine which is further modified with the at least one component B, which is dispersed in a liquid diluent.

In a preferred embodiment, the invention relates in particular to a liquid composition in the form of a liquid coating composition, which comprises a particulate solid material, in particular a pigment or a filler and a branched modified polyetheramine and/or a branched modified polyetheramine which is further modified with the at least one component B, which is neutralised with an acid of formula (V) or (VI), which is dispersed in a liquid diluent.

In a preferred embodiment, the invention also relates in particular to a liquid composition in the form of a liquid ink composition, which comprises a particulate solid material, in particular a pigment or a filler, and a branched modified polyetheramine and/or a branched modified polyetheramine which is further modified with the at least one component B, which is dispersed in a liquid diluent.

In a preferred embodiment, the invention also relates in particular to a liquid composition in the form of a liquid ink composition, which comprises a particulate solid material, in particular a pigment or a filler, and a branched modified polyetheramine and/or a branched modified polyetheramine which is further modified with the at least one component B which is neutralised with an acid of formula (V) or (VI), which is dispersed in a liquid diluent.

In a preferred embodiment, the suitable solid particular materials include, but are not limited to, the group consisting of pigments and fillers. The pigments comprise inorganic or an organic pigments. The pigments can include the colored pigments and the pearlescent flakes.

In a preferred embodiment, the size of the particulate material is preferably in the micrometre range, e.g. the weight average particle diameter is in the range from 1 µm to 2000 µm, in particular form 2 µm to 1000 µm or from 5 µm to 500 µm. The weight average particle diameter can be determined by the sieving analysis. The weight average particle diameter can also be determined by the light scattering methods.

Examples of the suitable organic pigments are the pigments and the pearlescent flakes selected from the group consisting of azo, disazo, naphthol, benzimidazolone, azocondensation, metal complex, isoindolinone, and isoindoline pigments, the chinophthalon pigment, dioxazine pigment and the polycyclic pigment group consisting of indigo, thioindigo, quinacridones, phthalocyanines, perylenes, perionones, anthraquinones, such as aminoanthraquinones or hydroxyanthraquinones, anthrapyrimidines, indanthrones, flavanthrones, pyranthrones, anthantrones, isoviolanthrones, diketopyrrolopyrroles, and carbazoles, e.g. carbazole violet, and the like. Further examples of the organic pigments can be found in the monograph: W Herbst, K. Hunger "*Industrielle Organische Pigmente*" 2$^{nd}$ Edition, 1995, VCH Verlagsgesellschaft. ISBN: 3-527-28744-2.

Examples of the suitable inorganic pigments are the metallic flakes, such as aluminium, aluminium oxide, calcium carbonate, silicon oxide and silicates, iron(III)oxide, chromium(III)oxide, titanium(IV)oxide, zirconium(IV)oxide, zinc oxide, zinc sulphide, zinc phosphate, mixed metal oxide phosphates, molybdenum sulphide, cadmium sulphide, carbon black or graphite, vanadates, such as bismuth vanadate, chromates, such as lead(IV)chromate, and molybdates, such as lead(IV)molybdate, and mixtures, crystal forms or modifications thereof, such as rutil, anatas, mica, talcum or kaolin.

In a preferred embodiment, the suitable fillers are calcium carbonate, silicates, glass fibres, glass beads, talc, kaolin, mica, barium sulphate, metal oxides and hydroxides, carbon black, graphite, wood powders, powders and fibres of other natural products and synthetic fibres.

In a preferred embodiment, the selection of the liquid diluent that is present in the dispersion will depend on the field of application in a known manner. The dispersants of the invention are particular useful in dispersions, where the diluent is selected from commonly used solvents in coatings technology. For water based formulations the diluent comprises water and may, aside from water, further comprise polar, water-miscible solvents, such as $C_1$-$C_4$ alkanols, e.g. methanol, ethanol, isopropanol, propanol or n-butanol, glycol ethers like butyl glycol, or methoxypropylene glycol, polyols, e.g. glycerol, ethyleneglycol, diethyleneglycol, triethylene, triethylene glycol or propylene glycol. For solvent based formulations, preferably less polar solvents like aliphatic hydrocarbons, esters like butyl acetate, or glycol ethers like methoxypropylene glycol or glycol ether esters like methoxypropylene glycol acetate and mixtures thereof are used as liquid diluents.

In a preferred embodiment, the weight ratio of the particulate solid material to the branched modified polyetheramine is in the range from ≥100:1 to ≤1:50, more preferably from 50:1 to 1:30, and even more preferably from 30:1 to 1:10.

In an embodiment, the liquid composition comprises
  a) ≥1 to ≤70% by weight, based on the total weight of the liquid composition, of the at least one particulate solid material selected from the group consisting of the pigments and the fillers;
  b) ≥0.5 to ≤50% by weight, based on the total weight of the liquid composition, of the branched modified polyetheramine or the branched modified polyetheramine which is further modified with at least one component B; and
  c) ≥10 to ≤98.5% by weight, based on the total weight of the liquid composition, of the at least one liquid diluent.

In an embodiment, the liquid composition comprises
  a) ≥1 to ≤70% by weight, based on the total weight of the liquid composition, of the at least one particulate solid material selected from the group consisting of the pigments and the fillers;
  b) ≥0.5 to ≤50% by weight, based on the total weight of the liquid composition, of the branched modified polyetheramine or the branched modified polyetheramine which is further modified with at least one component B which is neutralised with an acid of formula (V) or (VI); and
  c) ≥10 to ≤98.5% by weight, based on the total weight of the liquid composition, of the at least one liquid diluent.

In a preferred embodiment, the liquid composition may further comprise binders and/or one or more conventional additives depending on the intended use. Conventional additives include e.g. plasticisers, lubricants, emulsifiers, humectants, rheology additives, catalysts, flow auxiliaries, optical brighteners, flame retardants, preservatives, antistatic agents or blowing agents.

In a preferred embodiment, the liquid dispersion may be in the form of a millbase. Such a millbase contains the particulate solid, the branched modified polyetheramine or branched modified polyetheramine which is further modified with at least one component B and the liquid diluent and optionally additives, but generally the millbase will not contain binders.

In a preferred embodiment, the liquid dispersion may be in the form of a millbase. Such a millbase contains the particulate solid, the branched modified polyetheramine or branched modified polyetheramine which is further modified with at least one component B which is is neutralised with an acid of formula (V) or (VI) and the liquid diluent and optionally additives, but generally the millbase will not contain binders.

In a preferred embodiment, the liquid dispersion may also be in the form of a coating composition. Such a coating composition contains the particulate solid, the branched modified polyetheramine or branched modified polyetheramine which is further modified with at least one component B which is neutralised with an acid of formula (V) or (VI) and the liquid diluent and additionally one or more binders, e.g. film-forming polymers or prepolymers which form a film upon curing. The coating composition may optionally contain conventional additives that are used in the coating technology, e.g. plasticisers, lubricants, emulsifiers, rheology additives, catalysts, flow auxiliaries, optical brighteners, flame retardants, preservatives, antistatic agents or blowing agents.

In a preferred embodiment, the liquid dispersion may also be in the form of a coating composition. Such a coating composition contains the particulate solid, the branched modified polyetheramine or the branched modified polyetheramine which is further modified with at least one component B and the liquid diluent and additionally one or more binders, e.g. film-forming polymers or prepolymers which form a film upon curing. Coating composition may optionally contain conventional additives that are used in the coating technology, e.g. plasticisers, lubricants, emulsifiers, rheology additives, catalysts, flow auxiliaries, optical brighteners, flame retardants, preservatives, antistatic agents or blowing agents.

In a preferred embodiment, the liquid dispersion may also be in the form of a coating composition. Such a coating composition contains the particulate solid, the branched modified polyetheramine or the branched modified polyetheramine which is further modified with at least one component B which is neutralised with an acid of formula (V) or (VI) and the liquid diluent and additionally one or more binders, e.g. film-forming polymers or prepolymers which form a film upon curing. The coating composition may optionally contain conventional additives used in the coating technology, e.g. plasticisers, lubricants, emulsifiers, rheology additives, catalysts, flow auxiliaries, optical brighteners, flame retardants, preservatives, antistatic agents or blowing agents.

In a preferred embodiment, the liquid dispersion may also be in the form of an ink, e.g. a printing ink or a gravure ink. Such an ink contains the particulate solid, the branched modified polyetheramine or branched modified polyetheramine which is further modified with at least one component B and the liquid diluent and additionally one or more binders conventionally used in the ink technology, e.g. film-forming polymers or prepolymers which form a film upon curing. The coating composition may optionally contain conventional additives, e.g. plasticisers, lubricants, emulsifiers, humectants, rheology additives, humectants, preservatives and antistatic agents.

In a preferred embodiment, the liquid dispersion may also be in the form of an ink, e.g. a printing ink or a gravure ink. Such an ink contains the particulate solid, the branched modified polyetheramine or branched modified polyetheramine which is further modified with at least one component B which is neutralised with an acid of formula (V) or (VI) and the liquid diluent and additionally one or more binders conventionally used in ink technology, e.g. film-forming polymers or prepolymers which form a film upon curing. Coating composition may optionally contain conventional additives, e.g. plasticisers, lubricants, emulsifiers, humectants, rheology additives, humectants, preservatives and antistatic agents.

The suitable binders are the ones customarily used, for example the ones described in *Ullmann's Encyclopedia of Industrial Chemistry*, 5th Edition, Vol. A18, pp. 368-426, VCH, Weinheim 1991, Germany. In general, the film-forming binder is based on a thermoplastic or thermosetting resin, preferably on a thermosetting resin. Examples thereof are alkyd, acrylic, polyester, phenolic, melamine, epoxy and polyurethane resins and mixtures thereof. Also resins curable by radiation or air-drying resins can be used. Binders may also be derived from polyvinylalcohol and polyvinylbutyral.

If cold- or hot-curable binders are used, the addition of a curing catalyst may be advantageous. Suitable catalysts that accelerate the curing of binders are described, for example, in *Ullmann's*, Vol. A18, loc. cit., p. 469.

In another preferred embodiment, the coating compositions comprise a branched modified polyetheramine or a branched modified polyetheramine, which is further modified with at least one component B and a cross linkable resin. Examples of coating compositions containing specific binders are:

Paints based on cold- or hot-cross linkable alkyd, acrylate, polyester, epoxy or melamine resins or mixtures of such resins, if desired with addition of a curing catalyst;

Two-component polyurethane paints based on hydroxyl-containing acrylate, polyester or polyether resins and aliphatic or aromatic isocyanates, isocyanurates or polyisocyanates;

One-component polyurethane paints based on blocked isocyanates, isocyanurates or polyisocyanates which are deblocked during baking, if desired with addition of a melamine resin;

One-component polyurethane paints based on a tri-salkoxycarbonyl triazine cross linker and a hydroxyl group containing resin such as acrylate, polyester or polyether resins;

One-component polyurethane paints based on aliphatic or aromatic urethane acrylates or polyurethane acrylates having free amino groups within the urethane structure and melamine resins or polyether resins, if necessary with curing catalyst;

Two-component paints based on (poly)ketimines and aliphatic or aromatic isocyanates, isocyanurates or polyisocyanates;

Two-component paints based on (poly)ketimines and an unsaturated acrylate resin or a polyacetoacetate resin or a methacrylamidoglycolate methyl ester;

Two-component paints based on carboxyl- or amino-containing polyacrylates and polyepoxides;

Two-component paints based on acrylate resins containing anhydride groups and on a polyhydroxy or polyamino component;

Two-component paints based on acrylate-containing anhydrides and polyepoxides;

Two-component paints based on (poly) oxazolines and acrylate resins containing anhydride groups, or unsaturated acrylate resins, or aliphatic or aromatic isocyanates, isocyanurates or polyisocyanates;

Two-component paints based on unsaturated polyacrylates and polymalonates;

Thermoplastic polyacrylate paints based on thermoplastic acrylate resins or externally cross linking acrylate resins in combination with etherified melamine resins; and Paint systems based on siloxane-modified or fluorine-modified acrylate resins.

In another preferred embodiment, the coating composition preferably comprises 0.01 to 100.0 percentage by weight of the combined components i) and ii), i.e. particulate solid and the branched modified polyetheramine or the branched modified polyetheramine which is further modified with at least one component B in the composition, in particular 0.05 to 50.0 w %, especially 0.1 to 20.0 w %, per 100 percentage by weight of solid binder.

In another preferred embodiment, the coating composition preferably comprises 0.01 to 100.0 percentage by weight of the combined components i) and ii), i.e. particulate solid and the branched modified polyetheramine or the branched modified polyetheramine which is further modified with at least one component B is neutralised with an acid of formula (V) or (VI), in particular 0.05 to 50.0 percentage by weight, especially 0.1 to 20.0 percentage by weight, per 100 percentage by weight of solid binder.

In a preferred embodiment, a method for preparing the liquid composition of the invention, the pigments are generally dispersed in the liquid diluent in the presence of the branched modified polyetheramine or the branched modified polyetheramine which is further modified with at least one component B. The dispersion can be achieved by using conventional techniques, such as high speed mixing, ball milling, sand grinding, attritor grinding or two or three roll milling. The resulting pigment dispersion may have a pigment to dispersant weight ratio in the above range. Thus the obtained dispersion is also termed as a millbase.

In a preferred embodiment, a method for preparing the liquid composition of the invention, the pigments are generally dispersed in the liquid diluent in the presence of the branched modified polyetheramine or the branched modified polyetheramine which is further modified with at least one component B, which is neutralised with an acid of formula (V) or (VI). The dispersion can be achieved by using conventional techniques, such as high speed mixing, ball milling, sand grinding, attritor grinding or two or three roll milling. The resulting pigment dispersion may have a pigment to dispersant weight ratio in the above range. Thus the obtained dispersion is also termed as a millbase.

In another preferred embodiment, the method for preparing the coating composition or an ink the millbase will generally be incorporated, e.g. by mixing, into a liquid composition of the binder. It is, however, also possible to disperse the particulate solid in a solution of the branched modified polyetheramine and/or the salts thereof and/or the branched modified polyetheramine which is further modified with at least one component B and the salts thereof, concentrating the resulting mixture by distilling off the solvents and/or water, preferably to dryness, and optionally further subjecting the resulting concentrate to thermal and/or mechanical treatment to prepare a mixture comprising pigments and modified copolymers which may then be subsequently dispersed in a liquid binder formulation. According to this process, the solid composition of the particulate solid and the branched modified polyetheramine and/or the branched modified polyetheramine which is further modified with at least one component B is easy to disperse and does not require time and energy intensive grinding to be incorporated into e.g. a paint formulation.

In another preferred embodiment, the method for preparing the coating composition or an ink the millbase will generally be incorporated, e.g. by mixing, into a liquid composition of the binder. It is, however, also possible to disperse the particulate solid in a solution of the branched modified polyetheramine and/or the salts thereof and/or the branched modified polyetheramine which is further modified with at least one component B and the salts thereof, is neutralised with an acid of formula (V) or (VI), concentrating the resulting mixture by distilling off the solvents and/or water, preferably to dryness, and optionally further subjecting the resulting concentrate to thermal and/or mechanical treatment to prepare a mixture comprising pigments and modified copolymers which may then be subsequently dispersed in a liquid binder formulation. According to this process, the solid composition of particulate solid and the branched modified polyetheramine and/or the branched modified polyetheramine which is further modified with at least one component B which is neutralised with an acid of formula (V) or (VI) is easy to disperse and does not require time and energy intensive grinding to be incorporated into e.g. a paint formulation.

In another aspect, the presently claimed invention is directed to the use of the branched modified polyetheramine and/or branched modified polyetheramine which is further modified with component B and the salts thereof as a dispersant for particulate solid material selected from the group consisting of pigments and fillers.

In another aspect, the presently claimed invention is directed to the use of the branched modified polyetheramine and/or branched modified polyetheramine which is further modified with component B and the salts thereof, is neutralised with an acid of formula (V) or (VI), as a dispersant for particulate solid material selected from the group consisting of pigments and fillers.

The presently claimed invention offers one or more of the following advantages:

1. The presently claimed invention provides a universal dispersant prepared by modifiying a branched polyetheramine polyol with at least one component B or further modifiying a branched modified polyetheramine polyol with at least one component B or a branched modified polyetheramine polyol with at least one component B or a branched modified polyetheramine polyol further modified with at least one component B is neutralised with an acid of formula (V) and/or (VI).
2. The coating composition prepared by using dispersant of present invention display excellent gloss and crater ranking.

In a preferred embodiment, weight average molecular weight is determined by gel permeation chromatography in accordance with DIN 55672-1.

In a preferred embodiment, number average molecular weight is determined by gel permeation chromatography in accordance with DIN 55672-1.

In a preferred embodiment, the amine number is determined in accordance with DIN 53176.

In a preferred embodiment, the acid number is determined in accordance with DIN EN ISO 2114.

In the following, specific embodiments of the present invention are described:

1. A branched modified polyetheramine having a weight average molecular weight $M_w$ in the range of ≥1000 g/mol to ≤100000 g/mol, which is obtained by reacting a mixture comprising,
   a) at least one branched polyetheramine polyol P containing at least one hydroxyl groups having a weight average molecular weight $M_w$ in the range of ≥500 g/mol to ≤10000 g/mol and
   b) at least one compound B selected from—
      i) compounds of formula (I)

$$R-Fg \qquad (I)$$

wherein R is selected from the group consisting of
      linear or branched alkyl having at least 6 carbon atoms, wherein alkyl is unsubstituted or substituted by 1 or 2 radicals selected from OH and $C_1$-$C_4$-alkoxy;
      linear or branched alkenyl having at least 6 carbon atoms, wherein alkenyl is unsubstituted or substituted by 1 or 2 radicals selected from OH and $C_1$-$C_4$-alkoxy;
      a cycloaliphatic radical having at least 5 carbon atoms, wherein the cycloaliphatic radical is unsubstituted or substituted by 1 or 2 radicals selected from OH, $C_1$-$C_4$-alkyl and $C_1$-$C_4$-alkoxy; and aryl and aryl-$C_1$-$C_4$-alkyl, wherein the aryl part is unsubstituted or substituted by 1, 2, 3, 4 or 5 radicals selected from halogen, OH, $NH_2$, $NHC_1$-$C_4$-alkyl, $N(C_1$-$C_4$-alkyl$)_2$, $C_1$-$C_4$-alkyl and $C_1$-$C_4$-alkoxy; and Fg is independently of one another, selected from the group consisting of carboxylic acid, carboxylic acid anhydride, carboxylic acid ester, isocyanate, and mixtures thereof;

(ii) compounds of the formulae (II) and (III)

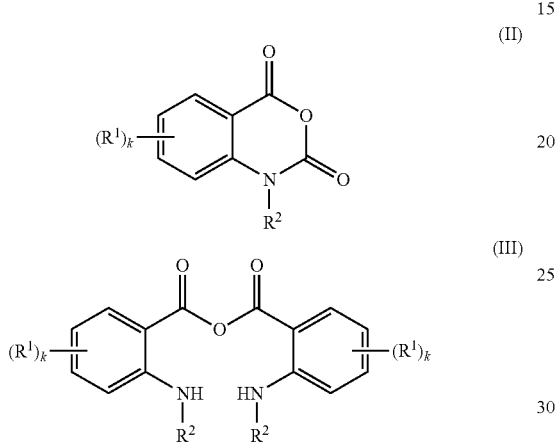

wherein
k is 0, 1, 2, 3 or 4;
$R^1$ is selected from the group consisting of halogen, OH, $NH_2$, $NHC_1$-$C_4$-alkyl, $N(C_1$-$C_4$-alkyl$)_2$, $C_1$-$C_4$-alkyl and $C_1$-$C_4$-alkoxy; and
$R^2$ is selected from the group consisting of hydrogen and $C_1$-$C_4$-alkyl;

(iii) lactones of the formula (IV)

wherein A is a $C_3$-$C_{12}$-alkylene, which is unsubstituted or substituted by 1 or 2 radicals selected from OH, $C_1$-$C_4$-alkyl and $C_1$-$C_4$-alkoxy;

iv) internal anhydride of the formula (V)

wherein D is selected from the group consisting of $C_2$-$C_6$ alkylene, $C_2$-alkenylene and 1,2-phenylene, where $C_2$-$C_6$ alkylene and $C_2$ alkenylene are unsubstituted or carry a $C_1$-$C_{18}$ alkyl or $C_1$-$C_{18}$ alkenyl radical and 1,2-phenylene is unsubstituted or substituted by 1 or 2 radicals selected from the group consisting of 1 or 2 radicals selected from OH, $C_1$-$C_4$-alkyl and $C_1$-$C_4$-alkoxy, —COOH or halogen.

2. The branched modified polyetheramine according to embodiment 1, having a weight average molecular weight $M_w$ in the range of ≥1000 g/mol to 100000 g/mol, which is obtained by reacting a mixture comprising, a) at least one branched polyetheramine polyol P containing at least one hydroxyl group having a weight average molecular weight $M_w$ in the range of ≥500 g/mol to ≤10000 g/mol and b) at least one compound B selected from—
i) compounds of formula (I)

R-Fg    (I)

wherein R is selected from the group consisting of
linear or branched alkyl having at least 6 carbon atoms, wherein alkyl is selected from ($CH_2$—C($CH_3)_2)_n$; or $C_nH_{2n+1}$, wherein n is an integer from 6 to 22, wherein alkyl is unsubstituted or substituted by 1 or 2 radicals selected from OH and $C_1$-$C_4$-alkoxy;

linear or branched alkenyl having at least 6 carbon atoms, wherein alkenyl is $C_nH_{2n-1}$, wherein n is an integer from 6 to 22, wherein alkenyl is unsubstituted or substituted by 1 or 2 radicals selected from OH and $C_1$-$C_4$-alkoxy;

a cycloaliphatic radical having at least 5 carbon atoms, wherein the cycloaliphatic radical is unsubstituted or substituted by 1 or 2 radicals selected, from OH, $C_1$-$C_4$-alkyl and $C_1$-$C_4$-alkoxy; and aryl and aryl-$C_1$-$C_4$-alkyl, wherein the aryl part is unsubstituted or substituted by 1, 2, 3, 4 or 5 radicals selected from halogen, OH, $NH_2$, $NHC_1$-$C_4$-alkyl, $N(C_1$-$C_4$-alkyl$)_2$, $C_1$-$C_4$-alkyl and $C_1$-$C_4$-alkoxy; and Fg is independently of one another, selected from the group consisting of carboxylic acid, carboxylic acid anhydride, carboxylic acid ester, isocyanate, and mixtures thereof;

(ii) compounds of the formulae (II) and (III)

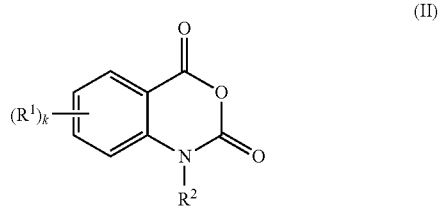

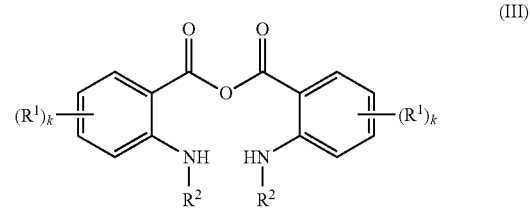

wherein
k is 0, 1, 2, 3 or 4;
$R^1$ is selected from the group consisting of halogen, OH, $NH_2$, $NHC_1$-$C_4$-alkyl, $N(C_1$-$C_4$-alkyl$)_2$, $C_1$-$C_4$-alkyl and $C_1$-$C_4$-alkoxy; and R² is selected from the group consisting of hydrogen and C₁-C₄-alkyl;
(iii) lactones of the formula (IV)

  (IV)

wherein A is a C₃-C₁₂-alkylene, which is unsubstituted or substituted by 1 or 2 radicals selected from OH, C₁-C₄-alkyl and C₁-C₄-alkoxy;
iv) internal anhydride of the formula (V)

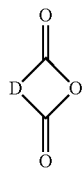  (V)

wherein D is selected from the group consisting of C₂-C₆ alkylene, C₂-alkenylene and 1,2-phenylene, where C₂-C₆ alkylene and C₂ alkenylene are unsubstituted or carry a C₁-C₁₈ alkyl or C₁-C₁₈ alkenyl radical and 1,2-phenylene is unsubstituted or substituted by 1 or 2 radicals selected from the group consisting of 1 or 2 radicals selected from OH, C₁-C₄-alkyl and C₁-C₄-alkoxy, —COOH or halogen.

3. The branched modified polyetheramine according to embodiment 1 or 2, wherein the weight average molecular weight $M_w$ of the branched modified polyetheramine is in the range of ≥1000 g/mol to ≤50000 g/mol.

4. The branched modified polyetheramine according to one or more of embodiments 1 to 3, wherein the compound B is selected from C₆-C₂₂-alkenyl succinic anhydrides, C₆-C₂₂-alkyl succinic anhydrides, polyisobutene succinic anhydrides, C₆-C₂₂-alkylisocyanates, C₆-C₂₂-fatty acids, C₁-C₄-alkyl esters of C₆-C₂₂-fatty acids, isatoic anhydride, and aliphatic C₄-C₁₂-lactones.

5. The branched modified polyetheramine according to one or more of embodiments 1 to 4, wherein the at least one branched polyetheramine polyol P contains ≥1 to ≤100 hydroxyl groups.

6. The branched modified polyetheramine according to one or more of embodiments 1 to 5, wherein the at least one compound B reacts with at least one hydroxyl group of the at least one branched polyetheramine polyol P by formation of at least one linking group selected from the group consisting of ester, urethane or amide.

7. The branched modified polyetheramine according to one or more of embodiments 1 to 6, wherein at least 5 mol % of the hydroxyl groups of the at least one branched polyetheramine polyol P are reacted with the at least one compound B.

8. The branched modified polyetheramine according to one or more of embodiments 1 to 7, wherein the molar ratio of functional groups Fg in the at least one compound of general formula (I) to hydroxyl groups in the at least one branched polyetheramine polyol P or
the molar ratio of groups in the at least one compound of general formula (II) and/or (III) to hydroxyl groups in the at least one branched polyetheramine polyol P is in the range of ≥0.1:1 to ≤1:1
or
the molar ratio of groups in the at least one compound of general formula (IV) to hydroxyl groups in the at least one branched polyetheramine polyol P is in the range of ≥1:1 to ≤10:1
or
the molar ratio of lactone groups in the at least one compound of general formula (V) to hydroxyl groups in the at least one branched polyetheramine polyol P is in the range from ≥0.05:1 to ≤2:1.

9. The branched modified polyetheramine according one or more of embodiments 1 to 8, wherein the weight ratio of the at least one compound B to the at least one branched polyetheramine polyol P is in the range from ≥1:3 to ≤3:1.

10. The branched modified polyetheramine according to one or more of embodiments 1 to 9, wherein the at least one branched polyetheramine polyol P is a polycondensation product of at least one tri-C₂-C₄-alkanolamine.

11. A branched modified polyetheramine having a weight average molecular weight $M_w$ in the range of ≥1000 g/mol to ≤100,000 g/mol, which is obtained by reacting a mixture comprising
c) at least one modified branched polyetheramine according to one or more of embodiments 1 to 10
and further modified with
d) at least one compound B selected from
i) compounds of formula (I)

R-Fg    (I)

wherein R is selected from the group consisting of
linear or branched alkyl having at least 6 carbon atoms, wherein alkyl is unsubstituted or substituted by 1 or 2 radicals selected from OH and C₁-C₄-alkoxy;
linear or branched alkenyl having at least 6 carbon atoms, wherein alkenyl is unsubstituted or substituted by 1 or 2 radicals selected from OH and C₁-C₄-alkoxy;
a cycloaliphatic radical having at least 5 carbon atoms, wherein the cycloaliphatic radical is unsubstituted or substituted by 1 or 2 radicals selected, from OH, C₁-C₄-alkyl and C₁-C₄-alkoxy; and
aryl and aryl-C₁-C₄-alkyl, wherein the aryl part is unsubstituted or substituted by 1, 2, 3, 4 or 5 radicals selected from halogen, OH, NH₂, NHC₁-C₄-alkyl, N(C₁-C₄-alkyl)₂, C₁-C₄-alkyl and C₁-C₄-alkoxy; and
Fg is independently of one another, selected from the group consisting of carboxylic acid, hydroxy carboxylic acid, carboxylic acid anhydride, carboxylic acid ester, isocyanate, and mixtures thereof;
(ii) compounds of the formulae (II) and (III)

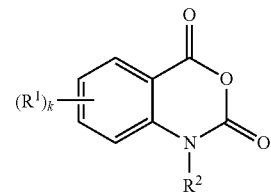  (II)

-continued

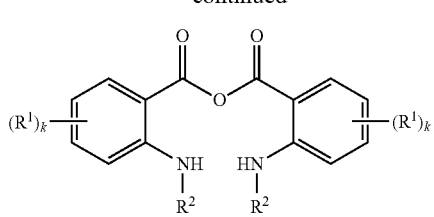

wherein
k is 0, 1, 2, 3 or 4;
$R^1$ is selected from the group consisting of halogen, OH, $NH_2$, $NHC_1$-$C_4$-alkyl, $N(C_1$-$C_4$-alkyl$)_2$, $C_1$-$C_4$-alkyl and $C_1$-$C_4$-alkoxy; and
$R^2$ is selected from the group consisting of hydrogen and $C_1$-$C_4$-alkyl;
(iii) lactones of the formula (IV)

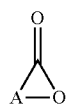

wherein A is a $C_3$-$C_{12}$-alkylene, which is unsubstituted or substituted by 1 or 2 radicals selected from OH, $C_1$-$C_4$-alkyl and $C_1$-$C_4$-alkoxy;
iv) internal anhydride of the formula (V)

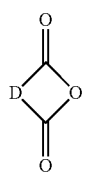

wherein D is selected from the group consisting of $C_2$-$C_6$ alkylene, $C_2$-alkenylene and 1,2-phenylene, where $C_2$-$C_6$ alkylene and $C_2$ alkenylene are unsubstituted or carry a $C_1$-$C_{18}$ alkyl or $C_1$-$C_{18}$ alkenyl radical and 1,2-phenylene is unsubstituted or substituted by 1 or 2 radicals selected from the group consisting of 1 or 2 radicals selected from OH, $C_1$-$C_4$-alkyl and $C_1$-$C_4$-alkoxy, —COOH or halogen;

12. The branched modified polyetheramine according to one or more of embodiments 1 to 11, wherein the at least one branched polyetheramine polyol P has an amine number determined according to ISO 25761 in the range from ≥200 to ≤1000 mg KOH/g.

13. The branched modified polyetheramine according to one or more of embodiments 1 to 12, which is neutralized with at least one polymeric carboxylic acid or at least one polymeric phosphoric acid.

14. The branched modified polyetheramine according to embodiment 13, wherein the at least one polymeric carboxylic acid or the at least one polymeric phosphoric acid comprises a poly-$C_2$-$C_6$-alkyleneoxide radical.

15. A liquid composition in the form of a dispersion comprising, the branched modified polyetheramine according to one or more of embodiments 1 to 14 and a particulate solid material selected from the group consisting of pigments and fillers and a liquid diluent, wherein the particulate solid material is dispersed in the liquid diluent.

16. The liquid composition according to embodiment 15, wherein the weight ratio of particulate solid material to the branched modified polyetheramine is in the range from ≥100:1 to ≤1:50.

17. The liquid composition according to embodiment 15 or 16, comprising,
a) ≥1 to ≤70% by weight, based on the total weight of the liquid composition, of at least one particulate solid material, selected from the group consisting of pigments and fillers;
b) ≥0.5 to ≤50% by weight, based on the total weight of the liquid composition, of the branched modified polyetheramine according to one or more of embodiments 1 to 16; and
c) ≥10 to ≤98.5% by weight, based on the total weight of the liquid composition, of at least one liquid diluent.

18. The liquid composition according to embodiment 17, which is in the form of a millbase, a coating composition or an ink.

19. Use of the branched modified polyetheramine according to one or more of embodiments 1 to 16 and the salts thereof as a dispersant for particulate solid material selected from the group consisting of pigments and fillers.

The invention is now further illustrated by the following examples.

EXAMPLES

The presently claimed invention is further illustrated in combination with the following examples. These examples are provided to exemplify the presently claimed invention, but are not intended to restrict the scope of the presently claimed invention in any way. The below listed chemicals are used and all are commercially available.

| | |
|---|---|
| Lupasol ® EO (polyetheramine polyol, Mw 7100 g/mol, Mn 4050 g/mol) | dibutyltin dilaurate |
| Pluriol ® A500 E (Methoxy terminated polyethyleneoxide, Mw 500 g/mol, Mn 480 g/mol) | phosphorous pentoxide |
| isatoic anhydride | Polyisobutylene ® SA F |
| 4-dimethylaminopyridine | dodecenylsuccinic anhydride |
| succinic anhydride | octadecyl isocyanate |
| Lutensol ® ON 70 ($C_{10}$-oxo alcohol ethoxylates) | stearic acid |
| tripropyleneglycol monomethyl ether | lauric acid |
| caprolactone | tall oil fatty acid |
| epsilon-caprolactone | gamma-valerolactone |
| 12-hydroxyl stearic acid | |

Methods:
The number average molecular weight and weight average molecular weight were determined by gel permeation chromatography in accordance with DIN 55672-1.

The amine number of modified branched polyetheramine was determined in accordance with DIN 53176.

The acid number was determined in accordance with DIN EN ISO 2114.

Example 1: Synthesis of Compound of Formula (VA1, Outside the Scope of the Invention)

A mixture of 50.0 g (0.1 mol OH) of Pluriol® A500 E, 16.3 g (0.1 mol) of isatoic anhydride (IA) and 0.2 g (0.3 wt.-%) of 4-dimethylaminopyridine were heated to 80 to 140° C. until no more $CO_2$ was evolved. Then, 10.0 g (0.1 mol) of succinic anhydride (SSA) was added and the reaction mixture was heated at 80° C. for an additional 3 hours to obtain the desired product. The product obtained was a yellowish liquid with an acid number of 75 mg KOH/g. Mw~810 g/mol, Mn~765 g/mol, PDI~1.05.

Example 2: Synthesis of Compound of Formula (VB1, Outside the Scope of the Invention)

A mixture of 84 g of Lutensol ON 70 and 16 g of succinic anhydride was stirred at 100° C. until the acid number reached 90 mg KOH/g to obtain the desired product. The product obtained is a colorless liquid. Mw~650 g/mol, Mn~610 g/mol, PDI~1.06.

Example 3: Synthesis of Compound of Formula (VI, Outside the Scope of the Invention)

A mixture of tripropyleneglycol monomethyl ether (1 mol), caprolactone (5.2 mol) and (0.01 mol) of dibutyltin dilaurate were heated to 160° C. under an inert gas, until a solids content of 97% had been reached to obtain the desired product. The polyether ester thus obtained was reacted with phosphorous pentoxide (0.033 mol) to produce mixture of mono and diester mixture as a yellow/colorless liquid with an acid number of 65 mg KOH/g. Mw 920 g/mol, Mn 850 g/mol, PDI of 1.08.

Example 4: Lupasol® EO-PIBSA

A mixture of 50 g Lupasol® EQ (BASF SE) and 60 g polyisobutylene SA F (BASF SE) was cooked at 80° C. under $N_2$ gas for 6 hours to obtain the desired product. The product obtained is a viscous yellowish liquid with an amine number of 190 mg KOH/g. Mw~11000 g/mol, Mn~7500 g/mol, PDI~1.5.

Example 5: Lupasol® EO-C12SAA

A mixture of 45 g Lupasol® EQ and 45 g dodecenylsuccinic anhydride was cooked at 80° C. under $N_2$ gas for 6 hours to obtain the desired product. The product obtained is a viscous yellowish liquid with an amine number of 200 mg KOH/g. Mw. 7500 g/mol, Mn of 4150 g/mol, PDI of 1.8.

Example 6: Lupasol® EO-Urethane C18

A mixture of 45 g Lupasol EO®, 40 g octadecyl isocyanate and 0.1 g DBTL was cooked at 80° C. under $N_2$ gas for 6 hours to obtain the desired product. The product obtained is a viscous yellowish wax with an amine number of 210 mg KOH/g. Mw~9500 g/mol, Mn~5500 g/mol, PDI~1.7.

Example 7: Lupasol® EO-stearic acid

A mixture of 45 g Lupasol® EO and 55 g stearic acid was cooked at 170° C. under $N_2$ gas until the acid number is lower than 10 mg KOH/g to obtain the desired product. The product obtained is a yellowish solid with an amine number of 180 mg KOH/g. Mw~10500 g/mol, Mn~6500 g/mol, PDI~1.6.

Example 8: Lupasol® EO-Lauric Acid

A mixture of 45 g Lupasol® EQ and 55 g lauric acid was cooked at 170° C. under $N_2$ gas until the acid number is lower than 10 mg KOH/g to obtain the desired product. The product obtained is a yellowish wax with an amine number of 180 mg KOH/g. Mw of 10520 g/mol, Mn of 6570 g/mol PDI of 1.6.

Example 9: Lupasol® EO-TOFA

A mixture of 45 g Lupasol® EO and 55 g tall oil fatty acid was cooked at 170° C. under $N_2$ gas until the acid number is lower than 10 mg KOH/g to obtain the desired product. The product obtained is a yellowish liquid with an amine number of 180 mg KOH/g. Mw~12500 g/mol, Mn~8250 g/mol, PDI~1.5.

Example 10: Lupasol® EO-CL

A mixture of 15 g Lupasol® EO, 75 g epsilon-caprolactone and 0.1 g Dibutyltin dilaurate was cooked at 170° C. until the solid content higher than 97% to obtain the desired product. The product obtained is a yellowish solid with an amine number of 68 mg KOH/g. Mw~17500 g/mol, Mn ~10250 g/mol, PDI~1.7.

Example 11: Lupasol® EO-CL/VL

A mixture of 15 g Lupasol® EO, 45 g epsilon-caprolactone, 20 g gamma-valerolactone and 0.1 g DBTL was cooked at 170° C. until the solid content higher than 97% to obtain the desired product. The product obtained is a yellowish liquid with an amine number of 77 mg KOH/g. Mw~18000 g/mol, Mn~12500 g/mol, PDI~1.4.

Example 12: Lupasol® EO-CL/VL/HSA

A mixture of 15 g Lupasol® EO, 45 g epsilon-caprolactone, 20 g gamma-valerolactone and 0.1 g DBTL was cooked at 170° C. until the solid content higher than 97%. And then 10 g 12-Hydroxyl stearic acid added and cooked at 170° C. until the acid number lower than 10 mg KOH/g to obtain the desired product. The product obtained is a yellowish liquid with an amine number of 69 mg KOH/g. Mw~14500 g/mol, Mn~9250 g/mol, PDI~1.5.

Example 13: Lupasol® EO-IA

A mixture of 70 g Lupasol® EQ and 20 g isatoic anhydride was slowly heat up to 130° C. and keep it at 130° C. until no $CO_2$ gas formed to obtain the desired product. The product obtained is a yellowish viscous liquid with an amine number of 390 mg KOH/g. Mw~7550 g/mol, Mn~4270 g/mol, PDI~1.8.

Example 14: Lupasol® EO-IA and Further CL/VL

A mixture of 42 g Example 13, 60 g epsilon-caprolactone, 30 g gamma-valerolactone and 0.15 g DBTL was cooked at 170° C. until the solid content higher than 97% to obtain the desired product. The product obtained is a yellowish viscous liquid with an amine number of 135 mg KOH/g. Mw~13500 g/mol, Mn~8550 g/mol, PDI~1.6.

Example 15: Lupasol® EO-IA and Further TOFA

A mixture of 42 g Example 13 and 30 g tall oil fatty acid was cooked at 170° C. under $N_2$ gas until the acid number is lower than 10 mg KOH/g to obtain the desired product.

The product obtained is a yellowish liquid with an amine number of 210 mg KOH/g. Mw~14500 g/mol, Mn~9850 g/mol, PDI~1.5.

Example 16: Lupasol® EO-TOFA Further SAA

A mixture of 50 g Example 9 and 5 g succinic anhydride was cooked at 100° C. until the acid number reached 55 mg KOH/g to obtain the desired product. The product obtained is a yellowish liquid with an amine number of 165 mg KOH/g. Mw~13500 g/mol, Mn~8550 g/mol, PDI~1.5.

Example 17: Lupasol® EO-TOFA Further IA

A mixture of 50 g Example 9 and 5 g isatoic anhydride was slowly heat up to 130° C. and keep it at 130° C. until no gas formed to obtain the desired product. The product obtained is a yellowish liquid with an amine number of 200 mg KOH/g. Mw~13700 g/mol, Mn~8680 g/mol, PDI~1.5.

Example 18: Lupasol® EO-TOFA Further CL/VL

A mixture of 50 g Example 9, 50 g epsilon-caprolactone, 20 g gamma-valerolactone and 0.15 g DBTL was cooked at 170° C. until the solid content higher than 97% to obtain the desired product. The product obtained is a yellowish viscous liquid with an amine number of 75 mg KOH/g. Mw~19500 g/mol, Mn~13500 g/mol, PDI~1.4.

Example 19: Lupasol® EO-CL/VL+Example 1

A mixture 40 g product of example 11 and 50 g product of example 1 was stirred at 80° C. for 30 min to obtain the desired product. The product obtained is a yellowish viscous liquid with an amine number of 35 mg KOH/g. Mw~11500 g/mol, Mn~6250 g/mol, PDI~1.9.

Example 17 Lupasol® EO-CL/VL/HSA+Example 2

A mixture 40 g product of example 12 and 50 g product of Example 2 was stirred at 80° C. for 30 min to obtain the desired product. The product obtained is a yellowish viscous liquid with an amine number of 33 mg KOH/g. Mw~9500 g/mol, Mn~5250 g/mol, PDI~1.8.

Example 18 Lupasol EO*-TOFA+Example 3

The mixture 40 g product of example 12 and 50 g product of Example 3 was stirred at 80° C. for 30 to obtain the desired product. The product obtained is a yellowish viscous liquid with an amine number of 78 mg KOH/g. Mw~9250 g/mol, Mn~3950 g/mol, PDI~2.3.

Performance Testing

In order to test the dispersion effect of the obtained samples, Resin Free Pigment Concentrates (mill-base) were prepared according to the following Table Millbase Formulation. The mill-base was dispersed in Scandex Shaker for 1 h with the help of glass beads. Afterwards the millbase was filtered and stored at room temperature overnight.

TABLE 1

Millbase Formulation:

| | Ingredients | (g) |
|---|---|---|
| 1) | EFKA-2550 (polyether modified polydimethylsiloxane) | 0.6 |
| 2) | Water | 47.4 |
| 3) | PEG 200 (Polyethylene glycol) | 11 |
| 4) | Dispersant example | 11 |
| 5) | PV23: Hostaperm. V. RL-NF (lila) (Dioxazine pigment) | 11 |
| 6) | NaOH (25%) | 2 |
| 7) | ASP170 (Kaolinite) | 17 |
| 8) | 2.0 mm glass beads [g] | 100.0 |
| | Total (g) | 200.0 |

The performance of the examples above was tested by determining the rheological behavior of the millbase formulations. The rheological behavior of the millbase was measured at 23° C. with a Thermo-Haake RheoStress 600 rheometer under CR-mode with rotation speed of 1 sec$^{-1}$, respectively, using a cone-plate sensor. The results are summarized in table 2.

TABLE 2

Dispersion effect in clear coat paint system

| | Viscosity (mPa · s) | | |
|---|---|---|---|
| Samples | 1 s$^{-1}$ | 10 s$^{-1}$ | 100 s$^{-1}$ |
| Lupasol ® EO | 36000 | 5550 | 850 |
| 4 | 3750 | 550 | 110 |
| 7 | 15000 | 1200 | 260 |
| 9 | 27000 | 4600 | 550 |
| 12 | 8500 | 750 | 350 |
| 15 | 21000 | 3800 | 450 |
| 19 | 6500 | 550 | 150 |
| 21 | 12600 | 1300 | 650 |

Lupasol ® EO is the raw material without any modification.

The dispersant performance was also tested in clear coating systems with respect to gloss and anti-cratering effect. The let-down formulations based on a clear coating system were prepared.

Let Down Formulation:

TABLE 3

| Ingredient | % by weight in formulation |
|---|---|
| Resin 1 | 24.7% |
| Resin 2 | 23.1% |
| Resin 3 | 11.5% |
| Plasticizer | 2.9% |
| Butyl Acetate | 18.9% |
| Xylene | 18.9% |
| Total | 100% |

Resin 1: Saturated polyester resin in solvent naphtha/methoxy propanol/xylene (Setal® 173 VS-60) from Nuplex;
Resin 2: Mixture of 64.8 g of a first cellulose acetate butyrate (CAB 381.2) and 25.2 g of a second cellulose acetate butyrate (CAB 381.20) in 255 g butyl acetate and 255 g of xylene, commercially available from Eastman Chemical;
Resin 3: Maprenal® MF 650: highly reactive isobutylated melamine-formaldehyde resin, commercially available from Ineos;

Plasticizer: Resamine® HF 480: Polyurea plasticizer, Carbamic resin based on butylurethane and formaldehyde, commercially available from Cytec.

Then, the colored paint compositions were prepared by mixing 1.0 g of the respective millbase with 9.0 g of the letdown formulation, respectively, under 5 minutes at 2000 rpm. The paint was applied on a polyester film with a 150 µm film thickness. The gloss of the obtained coatings at a 20° angle was determined according to DIN 67530 using a commercial reflectometer (Micro-Tri-Gloss reflectometer from BYK Gardner). The performance results are summarized in table 4.

TABLE 4

Gloss (20°) and crater visual ranking
(0 = no, 1 = few, 3 = some, 5 = a lot)

|  | gloss (20°) | crater ranking |
|---|---|---|
| Lupasol ® EO | 80 | 5 |
| 4 | 85 | 1 |
| 7 | 84 | 1 |
| 9 | 85 | 1 |
| 12 | 83 | 0 |
| 15 | 87 | 1 |
| 19 | 86 | 0 |
| 21 | 85 | 0 |

Lupasol ® EO is the raw material without any modification.

It is evident from the tables 2 and 4 that the dispersant prepared by modifying a branched polyetheramine polyol with at least one component B or further modifying a branched modified polyetheramine polyol with at least one component B or a branched modified polyetheramine polyol with at least one component B or a branched modified polyetheramine polyol further modified with at least one component B is neutralised with an acid of formula (V) and/or (VI) display excellent gloss and crater ranking.

The advantage of the presently claimed invention is that the dispersant prepared by modifying a branched polyetheramine polyol with at least one component B or further modifying a branched modified polyetheramine polyol with at least one component B or a branched modified polyetheramine polyol with at least one component B or a branched modified polyetheramine polyol further modified with at least one component B which is neutralised with an acid of formula (V) and/or (VI) display excellent gloss and crater ranking.

The invention claimed is:
1. A branched modified polyetheramine having a weight average molecular weight $M_w$ in the range of ≥1000 g/mol to ≤30000 g/mol, and an amine number in the range from 30 to ≤400 mg KOH/g, which is obtained by reacting a mixture comprising,
a) at least one branched polyetheramine polyol P containing at least one hydroxyl groups, having a weight average molecular weight $M_w$ in the range of ≥500 g/mol to ≤10000 g/mol,
wherein the at least one branched polyetheramine polyol P is a polycondensation product of at least one tri-C2-C4-alkanolamine,
wherein the at least one branched polyetheramine polyol P has an amine number in the range from ≥200 to ≥600 mg KOH/g,
and
b) at least one compound B selected from—
(i) compounds of formula (I)

R-Fg                      (I)

wherein R is selected from the group consisting of
linear or branched alkyl having at least 6 carbon atoms, wherein alkyl is unsubstituted or substituted by 1 or 2 radicals selected from OH and $C_1$-$C_4$-alkoxy;
linear or branched alkenyl having at least 6 carbon atoms, wherein alkenyl is unsubstituted or substituted by 1 or 2 radicals selected from OH and $C_1$-$C_4$-alkoxy;
a cycloaliphatic radical having at least 5 carbon atoms, wherein the cycloaliphatic radical is unsubstituted or substituted by 1 or 2 radicals selected, from OH, $C_1$-$C_4$-alkyl and $C_1$-$C_4$-alkoxy; and
aryl and aryl-$C_1$-$C_4$-alkyl, wherein the aryl part is unsubstituted or substituted by 1, 2, 3, 4 or 5 radicals selected from halogen, OH, $NH_2$, $NHC_1$-$C_4$-alkyl, $N(C_1$-$C_4$-alkyl$)_2$, $C_1$-$C_4$-alkyl and $C_1$-$C_4$-alkoxy; and Fg is independently of one another, selected from the group consisting of carboxylic acid, carboxylic acid anhydride, carboxylic acid ester, isocyanate, and mixtures thereof, (ii) compounds of the formulae (II) and (III)

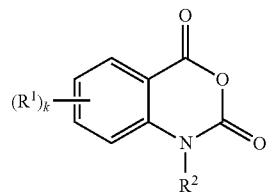

(II)

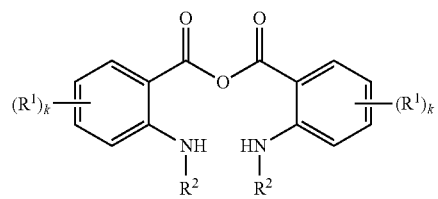

(III)

wherein
k is 0, 1, 2, 3 or 4;
$R^1$ is selected from the group consisting of halogen, OH, $NH_2$, $NHC_1$-$C_4$-alkyl, $N(C_1$-$C_4$-alkyl$)_2$, $C_1$-$C_4$-alkyl and $C_1$-$C_4$-alkoxy; and
$R^2$ is selected from the group consisting of hydrogen and $C_1$-$C_4$-alkyl;

(iii) lactones of the formula (IV)

(IV)

wherein A is a $C_3$-$C_{12}$-alkylene, which is unsubstituted or substituted by 1 or 2 radicals selected from OH, $C_1$-$C_4$-alkyl and $C_1$-$C_4$-alkoxy;

iv) internal anhydride of the formula (V)

wherein D is selected from the group consisting of $C_2$-$C_6$ alkylene, $C_2$-alkenylene and 1,2-phenylene, where $C_2$-$C_6$ alkylene and $C_2$ alkenylene are unsubstituted or carry a $C_1$-$C_{18}$ alkyl or $C_1$-$C_{18}$ alkenyl radical and 1,2-phenylene is unsubstituted or substituted by 1 or 2 radicals selected from OH, $C_1$-$C_4$-alkyl and $C_1$-$C_4$-alkoxy, —COOH or halogen.

2. The branched modified polyetheramine according to claim 1, wherein the at least one compound B is selected from $C_6$-$C_{22}$-alkenyl succinic anhydrides, $C_6$-$C_{22}$-alkyl succinic anhydrides, polyisobutene succinic anhydrides, $C_6$-$C_{22}$-alkylisocyanates, $C_6$-$C_{22}$-fatty acids, $C_1$-$C_4$-alkyl esters of $C_6$-$C_{22}$-fatty acids, isatoic anhydride, and aliphatic $C_4$-$C_{22}$-lactones.

3. The branched modified polyetheramine according to claim 1, wherein the at least one branched polyetheramine polyol P contain $\geq 2$ to $\leq 100$ hydroxyl groups.

4. The branched modified polyetheramine according to claim 1, wherein the at least one compound B reacts with at least one hydroxyl group of the at least one branched polyetheramine polyol P to form at least one linking group selected from the group consisting of ester, urethane and/or amide.

5. The branched modified polyetheramine according to claim 1, wherein at least 5 mol % of the hydroxyl groups of the at least one branched polyetheramine polyol P are reacted with the at least one compound B.

6. The branched modified polyetheramine according to claim 1 wherein the molar ratio of functional groups Fg in the compounds of formula (I) to hydroxyl groups in the at least one branched polyetheramine polyol P is in the range of $\geq 0.1:1$ to $\leq 1:1$ or the molar ratio of functional groups in the compounds of the formula (II) and(III) to hydroxyl groups in the at least one branched polyetheramine polyol P is in the range of $\geq 0.1:1$ to $\leq 1:1$ or the molar ratio of groups in the lactones of the formula (IV) to hydroxyl groups in the at least one branched polyetheramine polyol P is in the range of $\geq 1:1$ to $\leq 10:1$ or the molar ratio of lactone groups in the internal anhydride of the formula (V) to hydroxyl groups in the at least one branched polyetheramine polyol P is in the range from $\geq 0.05:1$ to $\leq 2:1$.

7. The branched modified polyetheramine according to claim 1, wherein the weight ratio of the at least one compound B to the at least one branched polyetheramine polyol P is in the range from $\geq 1:3$ to $\leq 3:1$.

8. The branched modified polyetheramine according to claim 1, which is neutralized with at least one polymeric carboxylic acid or at least one polymeric phosphoric acid.

9. The branched modified polyetheramine according to claim 8, wherein the at least one polymeric carboxylic acid or the at least one polymeric phosphoric acid comprises a poly-$C_2$-$C_6$-alkyleneoxide radical.

10. The branched modified polyetheramine according to claim 1, wherein the at least one branched modified polyetheramine has an amine number in the range from $\geq 200$ to $\leq 390$ mg KOH/g.

11. The branched modified polyetheramine according to claim 1, wherein the at least one branched polyetheramine polyol P has a weight average molecular weight $M_w$ in the range of $\geq 500$ g/mol to $\leq 3,000$ g/mol.

12. The branched modified polyetheramine according to claim 1, wherein the branched modified polyetheramine has a weight average molecular weight $M_w$ in the range of 7,550 g/mol to 13,700 g/mol.

13. A liquid composition in the form of a dispersion comprising, the branched modified polyetheramine according to claim 1 and a particulate solid material selected from the group consisting of pigments and fillers and a liquid diluent, wherein the particulate solid material is dispersed in the liquid diluent.

14. The liquid composition according to claim 13, wherein the weight ratio of particulate solid material to the branched modified polyetheramine is in the range from $\geq 100:1$ to $\leq 1:50$.

15. The liquid composition according to claim 13, comprising,
a) $\geq 1$ to $\leq 70\%$ by weight, based on the total weight of the liquid composition, of at least one particulate solid material, selected from the group consisting of pigments and fillers;
b) $\geq 0.5$ to $\leq 50\%$ by weight, based on the total weight of the liquid composition, of B the branched modified polyetheramine; and
c) $\geq 10$ to $\leq 98.5\%$ by weight, based on the total weight of the liquid composition, of at least one liquid diluent.

16. The liquid composition according to claim 15, which is in the form of a millbase, a coating composition or an ink.

* * * * *